(12) United States Patent
Zwilling et al.

(10) Patent No.: US 7,965,393 B2
(45) Date of Patent: Jun. 21, 2011

(54) REFERENCE SIGNAL GENERATING CONFIGURATION FOR AN INTERFEROMETRIC MINIATURE GRATING ENCODER READHEAD USING FIBER OPTIC RECEIVER CHANNELS

(75) Inventors: Avron Zwilling, Redmond, WA (US); Joseph Daniel Tobiason, Woodinville, WA (US); Scott Harsila, Bothell, WA (US); Karl Gustav Masreliez, Banyuls-sur-mer (FR)

(73) Assignee: Mitutoyo Corporation, Kawasaki-shi (JP)

( * ) Notice: Subject to any disclaimer, the term of this patent is extended or adjusted under 35 U.S.C. 154(b) by 388 days.

(21) Appl. No.: 12/275,170

(22) Filed: Nov. 20, 2008

(65) Prior Publication Data

US 2009/0135435 A1    May 28, 2009

Related U.S. Application Data

(63) Continuation-in-part of application No. 11/782,608, filed on Jul. 24, 2007, now abandoned.

(51) Int. Cl.
*G01B 11/02* (2006.01)
(52) U.S. Cl. ...................................................... 356/499
(58) Field of Classification Search .................. 356/499, 356/521, 616–618; 250/231.13, 231.14, 250/231.16, 231.17
See application file for complete search history.

(56) References Cited

U.S. PATENT DOCUMENTS

| | | | |
|---|---|---|---|
| 3,985,448 A | 10/1976 | Wiklund | |
| 4,492,861 A | 1/1985 | Kebschull | |
| 4,573,000 A | 2/1986 | Nelle | |
| 5,059,791 A | 10/1991 | Ishizuka | |
| 5,073,710 A | 12/1991 | Takagi | |
| 5,325,176 A | 6/1994 | Suda | |
| 5,428,445 A | 6/1995 | Holzapfel | |
| 5,678,319 A | 10/1997 | Huber | |
| 5,739,911 A | 4/1998 | Holzapfel | |
| 5,856,872 A | 1/1999 | Horwitz | |
| 5,929,789 A | 7/1999 | Barbehenn | |
| 5,981,941 A | 11/1999 | Takata | |
| 6,175,414 B1 | 1/2001 | Holzapfel | |
| 6,198,534 B1 | 3/2001 | Hofer | |
| 6,229,140 B1 | 5/2001 | Ishizuka | |
| 6,272,403 B2 | 8/2001 | Sugitani | |
| 6,392,224 B1 | 5/2002 | Holzapfel | |
| 6,472,658 B2 | 10/2002 | Mayer | |
| 6,664,535 B1 | 12/2003 | Nahum | |
| 6,906,315 B2 | 6/2005 | Tobiason | |
| 7,053,362 B2 * | 5/2006 | Tobiason et al. | .......... 250/231.16 |
| 7,126,696 B2 | 10/2006 | Tobiason | |
| 7,268,883 B2 | 9/2007 | Holzapfel | |
| 7,289,042 B2 | 10/2007 | Gordon-Ingram | |

(Continued)

*Primary Examiner* — Michael A Lyons
(74) *Attorney, Agent, or Firm* — Christensen O'Connor Johnson Kindness PLLC

(57) ABSTRACT

A reference mark configuration for an interferometric miniature grating encoder readhead using fiber optic receiver channels is provided. The readhead includes primary fibers that provide reference mark primary signals processed to generate a reference signal with accuracy of approximately 0.2 microns. The readhead may include secondary fibers used to generate reference mark secondary signals processed to generate a reference signal with accuracy of approximately 20 nanometers. Spatial filter masks configured for the secondary fiber optic receiver channels provide two spatially periodic secondary signals arising from interference fringes outside of the receiving area of the primary fiber optic receiver channels. The secondary signals are out of phase with one another and their spatial frequency is higher than that of the primary signals. A signal crossing of the reference mark secondary signals is identified that is spatially adjacent to a signal crossing of the reference mark primary reference signals.

29 Claims, 20 Drawing Sheets

U.S. PATENT DOCUMENTS

| | | |
|---|---|---|
| 7,324,212 B2 | 1/2008 | Mitchell |
| 7,348,544 B2 | 3/2008 | Atsuta |
| 7,571,552 B2 | 8/2009 | McAdam |
| 2002/0014581 A1 | 2/2002 | Yamamoto |
| 2003/0047673 A1 | 3/2003 | Thorburn |
| 2004/0135077 A1 | 7/2004 | Hane |
| 2007/0227438 A1 | 10/2007 | Howley |
| 2008/0024789 A1* | 1/2008 | Tobiason et al. ............... 356/521 |
| 2009/0027692 A1* | 1/2009 | Zwilling et al. ............... 356/617 |
| 2009/0072130 A1 | 3/2009 | Chase |
| 2009/0127131 A1 | 5/2009 | McFarland |
| 2009/0135435 A1 | 5/2009 | Zwilling |

* cited by examiner

REFERENCE SIGNAL GENERATING CONFIGURATION FOR AN INTERFEROMETRIC MINIATURE GRATING ENCODER READHEAD USING FIBER OPTIC RECEIVER CHANNELS

CROSS-REFERENCE TO RELATED APPLICATION

This application is a continuation-in-part of patent application Ser. No. 11/782,608, filed Jul. 24, 2007, now abandoned the disclosure of which is hereby expressly incorporated by reference herein.

FIELD OF THE INVENTION

This invention relates generally to displacement sensing optical encoders, and more particularly to providing a reference signal for a miniature fiber optic encoder utilizing optical fibers as receiver elements.

BACKGROUND OF THE INVENTION

Various miniature fiber optic grating encoders that use fiber optic receiver channels are known, including those disclosed in U.S. Pat. Nos. 6,906,315; 7,053,362; and 7,126,696, (hereinafter "the '315, '362, and '696 patents") each of which is hereby incorporated herein by reference in its entirety. Such miniature encoders offer a desirable combination of features, which may include extremely small size, very high accuracy, electrical noise immunity, and very high speed operation.

Many motion control and/or position measurement systems, or the like, include provisions for inputting a reference signal that is usable to identify a particular period within a grating scale. The reference signal, generally corresponding to a feature that is fixed relative to the grating scale, provides a reference point that eliminates the position ambiguities that may otherwise arise in incremental type displacement measuring systems, which count signal periods as a basis for long range measurements.

However, a reference signal generating configuration that is easily and economically combinable with miniature fiber optic grating encoders such as those included in the above references, and that provides similar desirable features, is not known. Such a reference signal generating configuration would be desirable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Briefly, the present invention is directed to providing a miniature fiber optic readhead and scale arrangement for measuring displacement that also includes a miniature fiber optic reference signal generating configuration usable to provide a reference position indication. In various embodiments, the scale includes a scale track comprising a first type of track portion providing first level of zero order reflectance (e.g., a phase grating), and a reference mark providing a second level of zero order reflectance (e.g., a mirror). Respective fiber optic reference signal receiver channels include respective apertures that receive detectably different amounts of zero order reflected light depending on their proximity and/or overlap with the reference mark, and a relationship between the optical reference mark signals is indicative of the reference position. A reference mark according to this invention has length or boundary spacing dimensions along the measuring axis direction that are determined based on certain fiber optic reference signal receiver channel aperture dimensions (e.g., size and spacing) in the readhead, which establishes a desirable relationship between the resulting respective reference mark signals.

In some configurations a fiber optic readhead and scale track that provides the reference position indication is separate from a fiber optic readhead and scale track that provides periodic incremental measurement signals. In some configurations an integrated fiber optic readhead and an integrated scale track provide both the reference position indication and the periodic incremental measurement signals.

In some configurations, respective fiber optic reference signal receiver channels that include respective apertures are used to generate higher resolution reference mark secondary signals and the previously mentioned optical reference mark signals are used as lower resolution reference mark primary signals. In particular, geometric design rules (e.g., for size and spacing) are used to configure spatial filter masks for the secondary signal receiver channel apertures such that they provide two spatially periodic secondary signals corresponding to interference fringes received outside of the receiving area of the primary signal receiver channels. A spatial frequency and/or rate of change of the reference mark secondary signals may be several times higher than an effective spatial frequency and/or rate of change of the reference mark primary signals. In some embodiments, the reference mark primary signals transition from a high to a low value over a distance on the order of 100 microns. In some embodiments, the spatial frequency of the secondary reference mark signals is on the order of 2-4 microns, and they are 180 degrees out of phase with one another. A "secondary" crossing point of the reference mark secondary signals can be identified that is spatially adjacent to the "primary" crossing point of the reference mark primary signals (which is the primary reference mark position). In some embodiments, the primary crossing point may be used to identify the primary reference mark position with a resolution and repeatability on the order of 0.2 microns. The secondary crossing point may be used to identify a secondary reference mark position with a resolution and repeatability on the order of 20 nanometers (10× improvement) due to the higher spatial frequency and/or higher rate of signal change of the reference mark secondary signals.

Importantly, a fiber optic reference signal generating configuration according to this invention offers desirable features similar to those of known miniature fiber optic grating encoders that provide incremental measurement (e.g., those disclosed in the '696 patent). For example, importantly, a fiber optic reference signal generating configuration according to this invention can be used at operating gaps similar or identical to the interferometric type fiber optic encoders disclosed in the '696 patent. In addition it offers similar extremely small size, high accuracy, electrical noise immunity, and very high speed operation. A miniature fiber optic reference signal generating configuration according to this invention is thus readily and economically combinable with desirable high-accuracy miniature fiber optic incremental measurement encoders.

Hence, the invention overcomes the disadvantages of prior art optical displacement sensing devices and provides new application possibilities with an ultra-compact, highly accurate, economical and high speed configuration.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
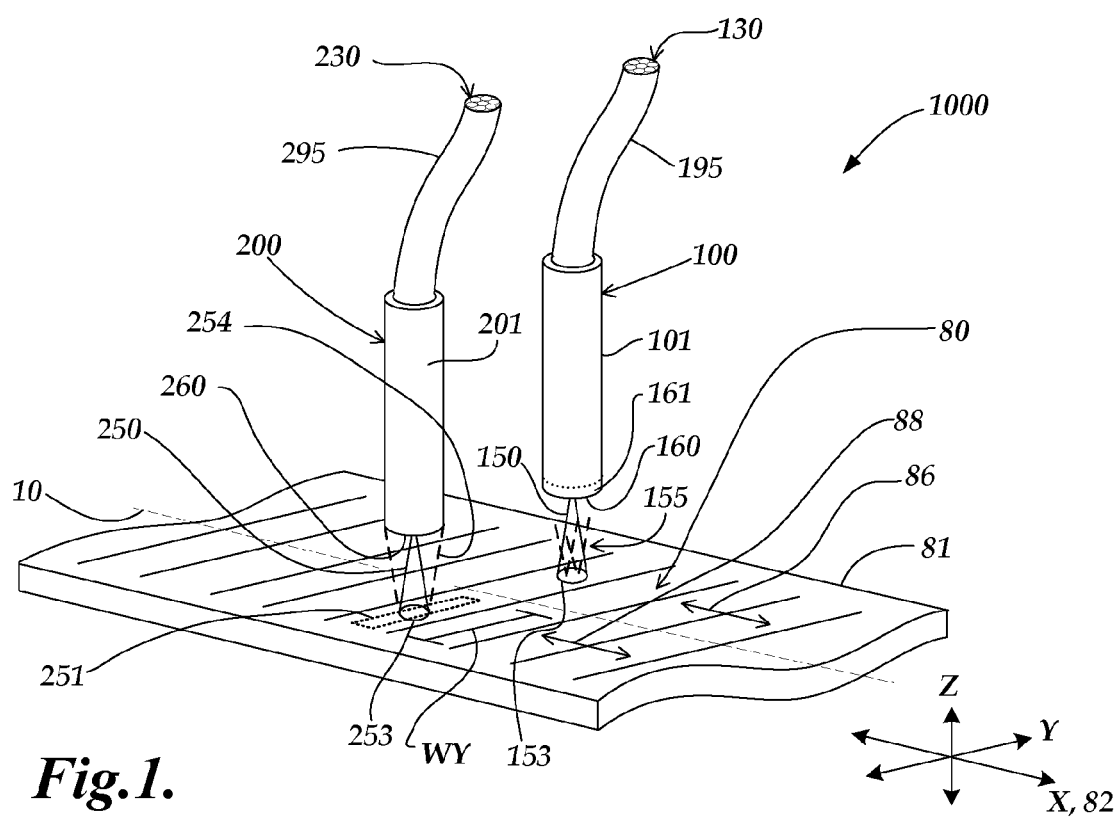
FIG. 1 is an isometric view of first embodiment of a miniature fiber optic readhead and scale arrangement that includes a reference signal generating configuration according to this invention.

FIG. 1 is an isometric view of a first embodiment of a miniature fiber optic readhead and scale arrangement 1000 that includes a reference signal generating configuration according to this invention. As shown in FIG. 1, the miniature fiber optic readhead and scale arrangement 1000 includes a scale member 81 that includes a scale grating 80, an incremental readhead 100, and a reference mark readhead 200. It will be appreciated the readheads 100 and 200 will generally be mounted rigidly relative to one another, or formed as a single unit, so that their displacements are synchronized.

An orthogonal XYZ coordinate system may be defined such that the y-axis is parallel to the bars of the scale grating 80, the z-axis is normal to the surface of the scale grating 80, and the x-axis is orthogonal to the y-z plane. A measuring axis 82 is parallel to the x-axis. In operation, the scale member 81 displaces along the measuring axis 82 such that the readhead 100 is displaced along an incremental measuring scale track 86 that includes the scale grating 80, and the readhead 200 is displaced along a reference scale track 88. In FIG. 1, an approximate boundary between the incremental measuring scale track 86 and reference scale track 88 is indicated by a dashed line 10. In the embodiment shown in FIG. 1, the reference scale track 88 generally includes the scale grating 80. However, importantly, the reference scale track 88 also includes one or more reference mark zones 251, described in greater detail below.

The incremental readhead 100 may be a prior art miniature fiber optic readhead that comprises a ferrule 101 that houses and positions the ends of a plurality of optical fibers 130 that are included in a fiber-optic cable 195. In various embodiments, the incremental readhead 100 may comprise any of the types of incremental readheads described in the incorporated references. In the embodiment shown in FIG. 1, the incremental readhead 100 comprises an interferometric-type readhead, described in detail in the incorporated '696 patent. Briefly, in operation, the readhead 100 outputs a diverging coherent source light 150 from the central one of the optical fibers 130, which illuminates the scale grating 80 at an illumination spot 153, where it is reflected and diffracted to provide scale light 155. In various embodiments, the scale grating 80 is a phase grating configured to suppress zero-order reflection. Therefore, the scale light 155 comprises primarily +/− first-order diffracted lights that are reflected to the readhead 100. The +/− first-order diffracted lights form a field of interference fringes proximate to a receiver plane 160 of a phase mask element 161. The phase mask element 161 provides a plurality of spatial filters at the receiver plane 160, having different spatial phases over the ends of the outer optical fibers 130, in order to provide a plurality of fiber optic incremental measurement signal receiver channels, as described in the '696 patent. As a result of the spatial filtering, the fiber-optic incremental measurement signal receiver channels may output periodic optical signals having different spatial phases (e.g., quadrature signals) when the scale grating 80 is displaced relative to the readhead 100.

The reference mark readhead 200 may comprise a ferrule 201 that houses and positions the ends of a plurality of optical fibers 230 that are included in a fiber-optic cable 295. In various embodiments, the reference mark readhead 200 may comprise various reference signal generating configurations according to this invention, as described in greater detail below. Briefly, in operation, the readhead 200 outputs a diverging source light 250 from the central one of the optical fibers 230, which illuminates the scale grating 80 and/or a reference mark zone 251, at an illumination spot 253. In various embodiments, the diverging source light 250 is advantageously monochromatic and spatially coherent, and may be temporally coherent in some embodiments. In general, the scale grating 80 provides reflected and diffracted scale light that produces a field of interference fringes, in the same manner outlined above with reference to the readhead 100. However, in various embodiments, the reference mark readhead 200 includes no phase mask element. As a result, the ends of the outer optical fibers 230, which provide a plurality of fiber optic reference mark signal receiver channels, simply receive an approximately constant "average" amount of light from that interference fringe field, regardless of displacement.

As previously indicated, in various embodiments, the scale grating 80 is a phase grating configured to suppress zero-order reflection. Thus, a reference mark may be formed by interrupting the structure and/or operation of the scale grating 80 by using at least one mirror-like reference mark portion in the reference mark zone 251. In such a case, when the reference mark zone 251 is located in the illumination spot 253, the mirror-like reference mark portion produces a zero-order reflection that provides a diverging scale light 254, as shown in FIG. 1. As a result, when the readhead 200 is displaced over the reference mark zone 251, the amount of "averaged" fringe light and the amount of zero-order reflected light that is received and transmitted as a reference signal (by any one of the ends of the outer optical fibers 230 that is used as a fiber optic reference mark signal receiver channel) will be modulated as a function of the amount of overlap of the illumination spot 253 and the reference mark portion(s) reference mark zone 251. A plurality of respective fiber optic reference mark signal receiver channels are used to receive and transmit such modulated optical reference signals, such that a reference position can be precisely determined, as described in greater detail below.

The reference mark portion(s) in the reference mark zone 251 may have a width WY along the Y axis direction, and provide an arrangement of boundaries spaced along the direction of measuring axis 82, as described in greater detail below. The width WY is generally not critical for the reference mark zone 251, or any of the other reference mark zones described herein, provided that it is sufficient to allow a desired alignment tolerance for the readhead 200 within the width of the reference mark scale track 88. In various embodiments, proper spacing of the boundaries of the reference mark portion(s) included in the reference mark zone 251 along the direction of measuring axis 82 may be critical for providing reliable and robust reference signals, and may generally depend on certain dimensions of the configuration of fibers and/or fiber optic reference mark signal receiver channel apertures provided in the readhead 200, as described in greater detail below.

Figure 2:
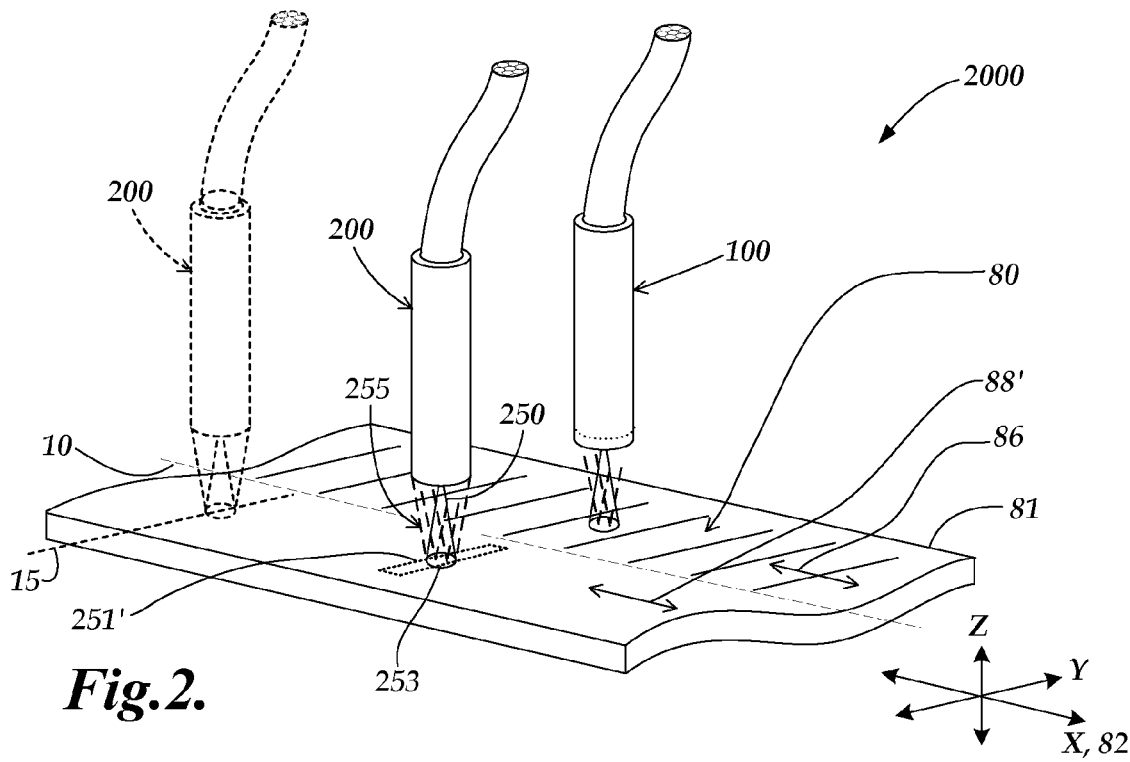
FIG. 2 is an isometric view of a second embodiment of a miniature fiber optic readhead and scale arrangement that includes a reference signal generating configuration according to this invention.

FIG. 2 is an isometric view of a second embodiment of a miniature fiber optic readhead and scale arrangement 2000 that includes a reference signal generating configuration according to this invention. The operation of the miniature fiber optic readhead and scale arrangement 2000 is in some respects similar to that of miniature fiber optic readhead and scale arrangement 1000 of FIG. 1, and similarly numbered components may be similar or identical in form and operation, except as otherwise indicated below. As shown in FIG. 2, the miniature fiber optic readhead and scale arrangement 2000 includes a scale member 81 that includes a scale grating 80, an incremental readhead 100, and a reference mark readhead 200. A primary difference between the miniature fiber optic readhead and scale arrangement 2000 and miniature fiber optic readhead and scale arrangement 1000 is that the structure of reference scale track 88' is different than that of reference scale track 88. In particular, at least that portion of the reference scale track 88' that surrounds the reference mark zone 251' comprises a track portion that provides significant amount of zero order reflectance (e.g., a mirror-like track portion) when illuminated by the diverging source light. The reference mark zone 251' is located within that track portion. In such an embodiment, the reference mark zone 251' includes at least one reference mark portion that provides a significantly less amount of zero order reflectance than the surrounding track portion (e.g., a grating portion designed to suppress zero order reflection). In some embodiments, grating reference mark portion(s) included in the reference mark zone 251' may be identical in structure to the scale grating 80 that extends along the incremental scale track 86. In one embodiment, a mirror-like track portion may extend approximately the entire length the reference scale track 88'.

Briefly, in operation, the readhead 100 is fixed relative to the readhead 200 (e.g., by mounting each readhead in the same mounting bracket) and the scale member 81 displaces along the measuring axis 82 such that the readhead 100 is displaced along an incremental measuring scale track 86 and the readhead 200 is displaced along the reference scale track 88'. In general, when the illumination spot 253 is located along the reference scale track 88' at positions proximate to, but not including, the reference mark zone 251' (e.g., positions comparable to that indicated by the dashed line 15), the mirror-like portion of the reference scale track 88' produces a strong zero-order reflection. As a result, the ends of the outer optical fibers 230, which provide a plurality of fiber optic reference mark signal receiver channels, receive an approximately constant and "large" amount of light from that zero-order reflection, over a range of displacements.

A reference mark may be formed by interrupting the structure and/or operation of the mirror-like track portion in the reference mark zone 251'. For example, a grating-type reference mark configured to suppress zero-order reflection may be located in the reference mark zone 251'. In such a case, when the reference mark zone 251' is located in the illumination spot 253, the grating portion reference mark suppresses zero-order reflection and produces +/− first order reflections as indicated by the diverging dashed lines in the diverging scale light 255, shown above, the reference mark zone 251' in FIG. 2. As a result, when the readhead 200 is displaced over the reference mark zone 251', the amount of zero-order reflected light is significantly reduced. In particular, zero order reflection is suppressed, and a significant portion of the reflected light is deflected away from the readhead 200, as +/− first and third order diffracted light. As a result, the light that is received and transmitted as a reference signal by any particular one of the ends of the outer optical fibers 230 that is used as a fiber optic reference mark signal receiver channel, will be modulated as a function of the amount of overlap of the illumination spot 253 and the reference mark portion(s) in the reference mark zone 251'. A plurality of respective fiber optic reference mark signal receiver channels are used to receive and transmit such modulated optical reference signals, such that a reference position can be precisely determined, as described in greater detail below.

As previously indicated, proper spacing of the boundaries of the reference mark portion(s) included in the reference mark zone 251' along the direction of measuring axis 82 may be critical for providing reliable and robust reference signals, and may generally depend on certain dimensions of the configuration of fibers and/or fiber optic reference mark signal receiver channel apertures provided in the readhead 200, as described in greater detail below.

Figures 3, 4:
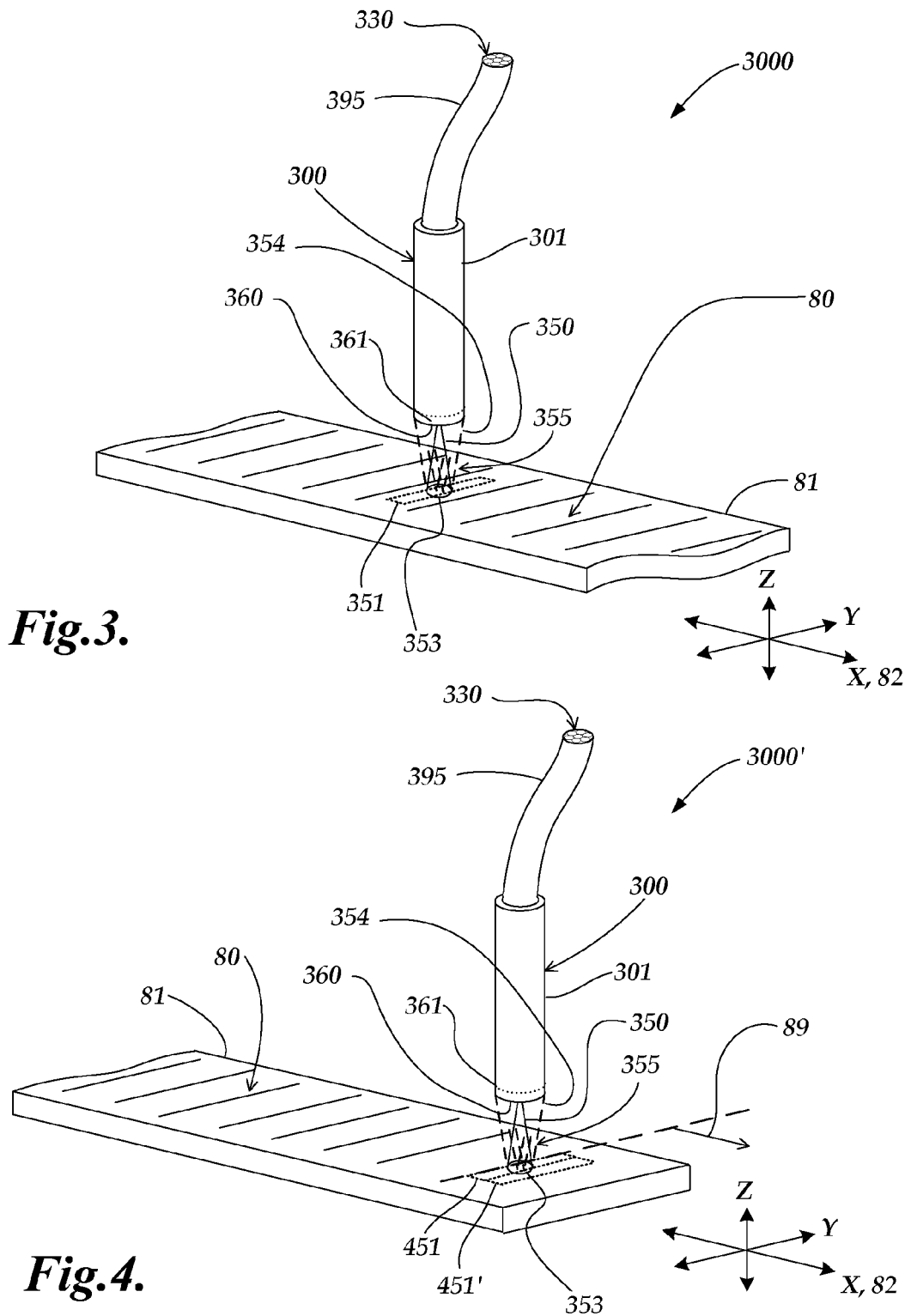
FIG. 3 is an isometric view of a third embodiment of a miniature fiber optic readhead and scale arrangement that includes a reference signal generating configuration according to this invention.
FIG. 4 is an isometric view of a fourth embodiment of a miniature fiber optic readhead and scale arrangement that includes a reference signal generating configuration according to this invention.

FIG. 3 is an isometric view of a third embodiment of a miniature fiber optic readhead and scale arrangement 3000 that includes a reference signal generating configuration according to this invention. The operation of the miniature fiber optic readhead and scale arrangement 3000 is in some respects similar to that of miniature fiber optic readhead and scale arrangement 1000 of FIG. 1, and similarly numbered components may be similar or identical in form and operation, except as otherwise indicated below. As shown in FIG. 3, the miniature fiber optic readhead and scale arrangement 3000 includes a scale member 81 that has a single scale track that includes a scale grating 80 and a reference mark zone 351, and an integrated incremental and reference mark readhead 300, also referred to simply as an integrated readhead 300. The scale grating 80 may be a phase grating configured to suppress zero-order reflection. The reference mark zone 351 may include at least one mirror-like reference mark portion, as previously outlined with reference to the reference mark zone 251 of FIG. 1. The integrated readhead 300 comprises a ferrule 101 that houses and positions the ends of a plurality of optical fibers 330 that are included in a fiber-optic cable 395. In various embodiments, the integrated readhead 300 may comprise any of the types of integrated readhead configurations described below with reference to FIGS. 10, 11, and 12, or the like.

Briefly, in operation, the integrated readhead 300 outputs a diverging source light 350 from the central one of the optical fibers 330, which illuminates the scale grating 80 at an illumination spot 353. In various embodiments, the source light 350 is advantageously monochromatic and spatially coherent, and may be temporally coherent in some embodiments. The source light 350 is generally reflected and diffracted to provide scale light 355. Scale light 355 comprises +/− first-order diffracted lights that are reflected to the readhead 300, to form a field of interference fringes proximate to a receiver plane 360 of a phase mask element 361, which spatially filters the interference fringes using phase mask portions having different spatial phases over the ends of certain ones of the outer optical fibers 330, in order to provide a plurality of fiber optic incremental measurement signal receiver channels according to previously described principles. As a result of the spatial filtering, certain fiber-optic receiver channels of the integrated readhead 300 provide incremental measurement signal receiver channels that may output periodic optical signals having different spatial phases (e.g., quadrature signals) when the scale grating 80 is displaced relative to the readhead 300.

In the embodiment shown in FIG. 3, the phase mask element 361 of the integrated readhead 300 also includes regions that provide no spatial filtering over the ends of certain ones of the outer optical fibers 330, to provide a plurality of fiber optic reference mark signal receiver channels that are used for providing reference signals arising from the mirror-like reference mark portion(s) in the reference mark zone 351. In various embodiments, when the reference mark zone 351 is located in the illumination spot 353, the mirror-like reference mark portion(s) produces a zero-order reflection that provides a diverging scale light 354, as shown in FIG. 3. As a result, when the readhead 300 is displaced over the reference mark zone 351, the amount of "averaged" fringe light and the amount of zero-order reflected light that is received and transmitted as a reference signal by the ends of certain outer optical fibers 330 that have no spatial filtering and that provide a plurality of fiber optic reference mark signal receiver channels, will be modulated as a function of the amount of overlap of the illumination spot 353 and the reference mark zone 351. The plurality of respective fiber optic reference mark signal receiver channels are used to receive and transmit such modulated optical reference signals, such that a reference position can be precisely determined, as described in greater detail below.

It should be appreciated that it is desirable for the integrated readhead 300 to continue to output the periodic optical signals having different spatial phases that are used for incremental displacement measurement (e.g., the incremental measurement quadrature signals), simultaneously with outputting the reference mark optical signals when illumination spot 353 of the integrated 300 overlaps the reference mark zone 351. Therefore, in various exemplary embodiments, it is advantageous to make the area of the mirror-like reference mark portion(s) that is included in the reference mark zone 351 as small possible, while also satisfying other reference mark design considerations, as described in greater detail below.

FIG. 4 is an isometric view of a fourth embodiment of a miniature fiber optic readhead and scale arrangement 3000' that includes a reference signal generating configuration according to this invention. The operation of the miniature fiber optic readhead and scale arrangement 3000' is in many respects similar to that of miniature fiber optic readhead and scale arrangement 3000 of FIG. 3, and similarly numbered components may be similar or identical in form and operation, except as otherwise indicated below. Generally, only the significant differences between the operation of the miniature fiber optic readhead and scale arrangements 3000' and 3000 are described below.

As shown in FIG. 4, the miniature fiber optic readhead and scale arrangement 3000' includes the integrated readhead 300 and a scale member 81, which has a single scale track that includes a scale grating 80 and a reference mark zone 451 and a reference mark boundary zone 451' located in an end region 89. The reference mark boundary zone 451' may include a track portion that is a grating portion (e.g., identical to the scale grating 80, in various embodiments) to provide a first boundary for the reference mark zone 451. The scale grating 80 may be a phase grating configured to suppress zero-order reflection, and provides a second boundary of the reference mark zone 451. It will be appreciated the boundary between the reference mark zone 451 and the scale grating 80 may approximately correspond to the end of the incremental displacement measuring range that is provided by the readhead and scale arrangement 3000'. Outside of zones 451 and 451' the end region 89 may generally comprise a mirror-like region.

The reference mark zone 451 may include a mirror-like reference mark portion and because it is bounded along the measuring axis direction by the scale grating 80 and the grating portion of the reference mark boundary zone 451', it may be substantially similar in structure and operation to the reference mark zone 351 previously described with reference to the readhead and scale arrangement 3000. One advantage of the readhead and scale arrangement 3000' over the readhead and scale arrangement 3000 is that the reference mark zone 451 is not located within the normal incremental displacement measuring range, where it might disturb the accuracy of the normal incremental displacement measurements to some extent.

In one embodiment, the reference mark boundary zone 451', being bounded by the mirror portion of the reference mark zone 451 and the mirror region of the end portion 89, may be substantially similar or identical in structure to the reference mark zone 251' previously described with reference to the readhead and scale arrangement 2000. In such an embodiment, the reference mark boundary zone 451' may be used to provide a secondary reference mark signal. In particular, the integrated readhead 300 generally receives a significant amount of zero order reflected light from the mirror-like end region 89 and reference mark portion(s) in the reference mark zone 451. However, when the illumination spot 353 overlaps the grating portion in the reference mark boundary zone 451' the zero order reflection is suppressed and a significant portion of the reflected light is diffracted away from the integrated readhead 300 as +/− first and third order diffracted light, according to previously described principles. As a result, the amount of light that is received and transmitted as a reference signal by the ends of certain outer optical fibers 330 that have no spatially filtering, will be modulated as a function of the amount of overlap of the illumination spot 353 and the reference mark boundary zone 451'. When the grating portion in the reference mark boundary zone 451' has an operational length LETOE, determined according to principles described further below, a secondary reference mark location can be precisely determined, if desired.

In various embodiments, the signals from the reference mark zone 451 may be used to determine the a reference mark location along the scale member 81, and to signal the end of the incremental displacement measuring range of the readhead and scale arrangement 3000'. In some embodiments, signals from the reference mark boundary zone 451' may be used to initiate a routine or circuit which acts as a "limit switch" for relative displacement of readhead and scale arrangement 3000', and/or that prepares a circuit to detect the location of the reference mark indicated by the reference mark zone 451 when an appropriate direction of relative displacement is provided.

Figure 5:
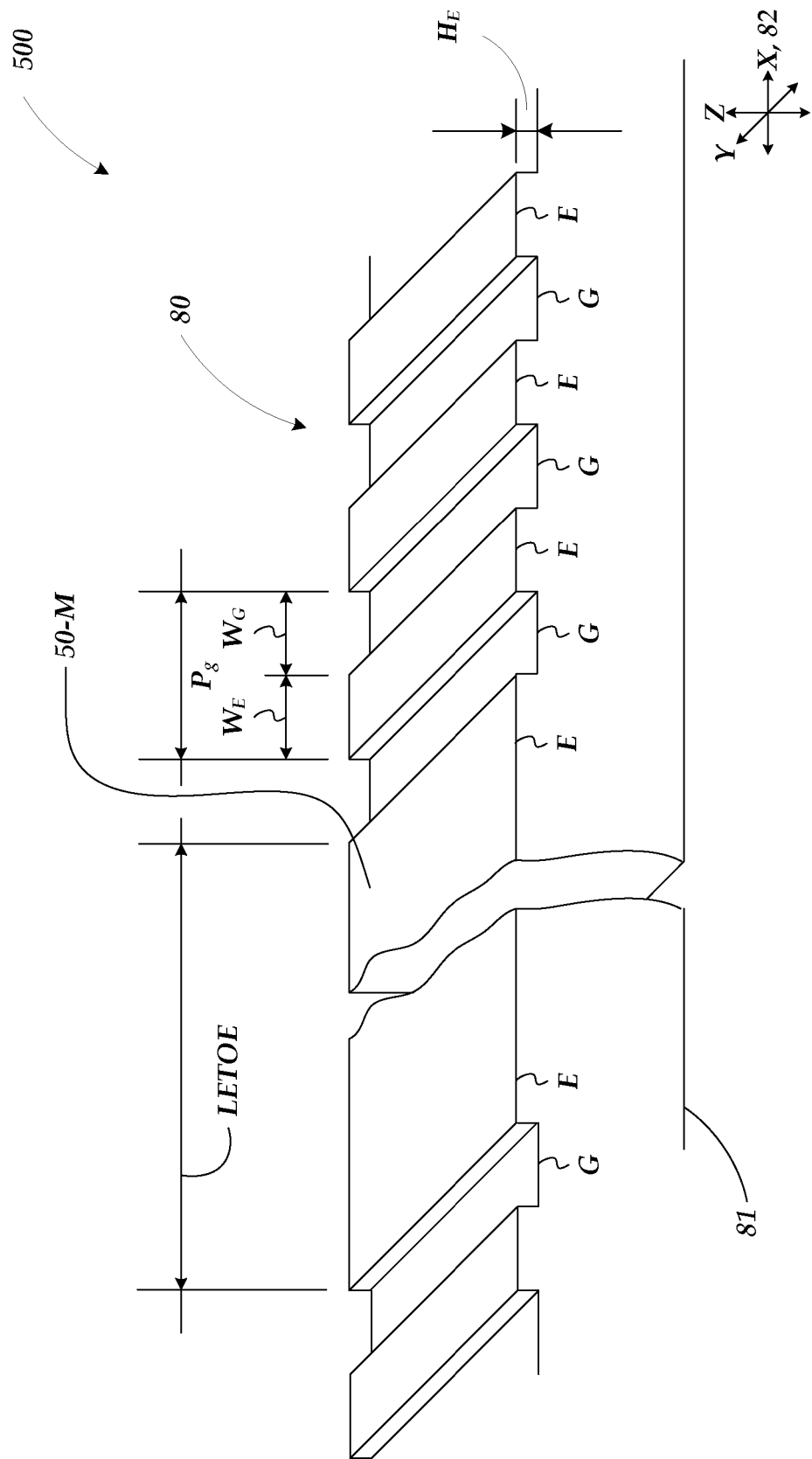
FIG. 5 is an isometric view showing one exemplary embodiment of a grating and reference mark structure according to this invention.

FIG. 5 is an isometric view showing one exemplary embodiment of a grating and reference mark structure 500 according to this invention. Components numbered similarly to those shown in FIGS. 1-4 may be similar or identical. The grating and reference mark structure 500 comprises a scale grating 80 and a mirror portion reference mark 50-M located on a scale member 81. The mirror portion reference mark 50-M is illustrated as a generic example. As shown in FIG. 5, the scale grating 80 includes grating elements E extending along the direction of the Y-axis, that are separated by recessed elements G. Grating elements E are arranged periodically along the measuring axis 82, according to a grating pitch $P_g$. Each of the grating elements E has a width $W_E$ along the direction of the measuring axis 82, while each of the recessed elements G has a width $W_G$. The grating elements E also have a recess height $H_E$ along the direction of the Z-axis. The particular embodiment of the scale grating 80 shown in FIG. 5 is designed to suppress zero order reflected light and all even diffraction orders. Methods for accomplishing this are described in the incorporated '696 patent, and are otherwise known in the art. Briefly, in one exemplary embodiment, the scale grating 80 may be formed as a reflective phase grating with a reflective chrome coating on both the rectangular grating elements E and the recessed elements G, and with a recess height $H_E$ between the grating elements that causes destructive interference of the zero order reflected light, for example a height of ¼ of the wavelength of the source light used with the grating and reference mark structure 500. A 50% duty cycle, that is, $W_E$ approximately equal to $W_G$, contributes to the best suppression of the $0^{th}$ order reflected light and also suppresses the rest of the even diffraction orders.

A mirror portion reference mark 50-M, having a length LETOE along the x-axis direction, may be located within the scale grating 80. Of course the scale grating 80 should remain in phase on each side of the mirror portion reference mark 50-M. In various exemplary embodiments, the mirror portion reference mark 50-M is sized and located such that its boundaries are in phase with similar boundaries of the grating elements E. In some embodiments, the length LETOE may coincide with (N+½) periods of the scale grating 80, where N is an integer. In some embodiments, N may be chosen in the range of 10 to 30 periods of the scale grating 80. However, this range is exemplary only, and not limiting. Considerations related to selecting a desirable length LETOE are described in greater detail below. It will be appreciated that the mirror portion reference mark 50-M is illustrated as being formed to correspond to the plane of the grating elements E, but it could alternatively be formed to correspond to the plane of the grating elements G. It should be appreciated that, in various embodiments, the mirror portion reference mark 50-M may be fabricated using a subset of the same steps used to fabricate the scale grating 80. Thus, the embodiment of the reference mark 50-M shown in FIG. 5 provides a particularly economical way of providing a reference mark that can be used in a miniature fiber optic readhead and scale arrangement that includes a phase-type scale grating 80 and an interferometric-type miniature fiber optic readhead. As illustrated in FIG. 5, the grating and reference mark structure 500 is particularly suitable for use in the scale track 88 of the readhead and scale arrangement 1000 shown in FIG. 1, where the mirror portion reference mark 50-M would be located in the reference mark zone 251, and in the readhead and scale arrangements 3000 and 3000' shown in FIGS. 3 and 4, where the mirror portion reference mark 50-M would be located in the reference mark zones 351 and 451, respectively.

It will be appreciated the roles of the grating and mirror features shown in FIG. 5 and described above can be reversed to provide a grating portion reference mark, having a length LETOE, embedded in a mirror scale track portion extending along the x-axis direction, and/or in a mirror region such as that included in the end region 89 shown in FIG. 4. It should be appreciated that such a grating portion reference mark, and an associated mirror scale track portion or mirror region, may be fabricated using the same steps that are used to fabricate an incremental measurement scale grating along an incremental measuring scale track on a scale member 81, thus providing a particularly economical way of providing a grating-type reference mark portion that can be used in a miniature fiber optic readhead and scale arrangement that includes a phase-type incremental measurement scale grating and an interferometric-type miniature fiber optic readhead. Such a structure including a grating-type reference mark portion would be particularly suitable for use in the scale track 88' of the readhead and scale arrangement 2000, shown in FIG. 2, where the grating-type reference mark portion would be located in the reference mark zone 251', and in the readhead and scale arrangements 3000' shown in FIG. 4, where grating-type reference mark portion would be located in the reference mark zone 451'.

Figure 6A:
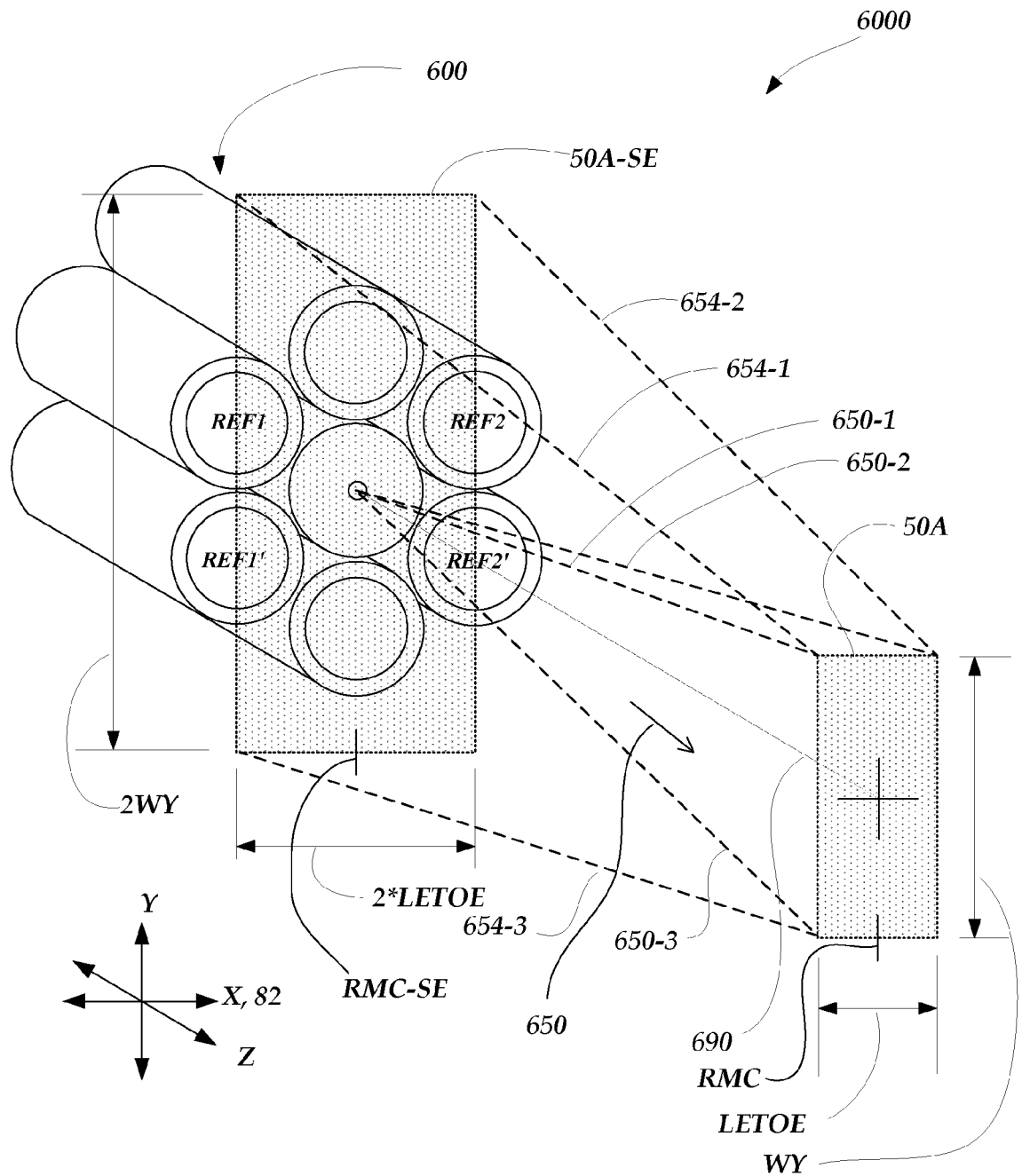
FIGS. 6A and 6B are isometric views schematically showing various aspects of a first embodiment of a reference signal generating configuration according to this invention.
Figure 6B:
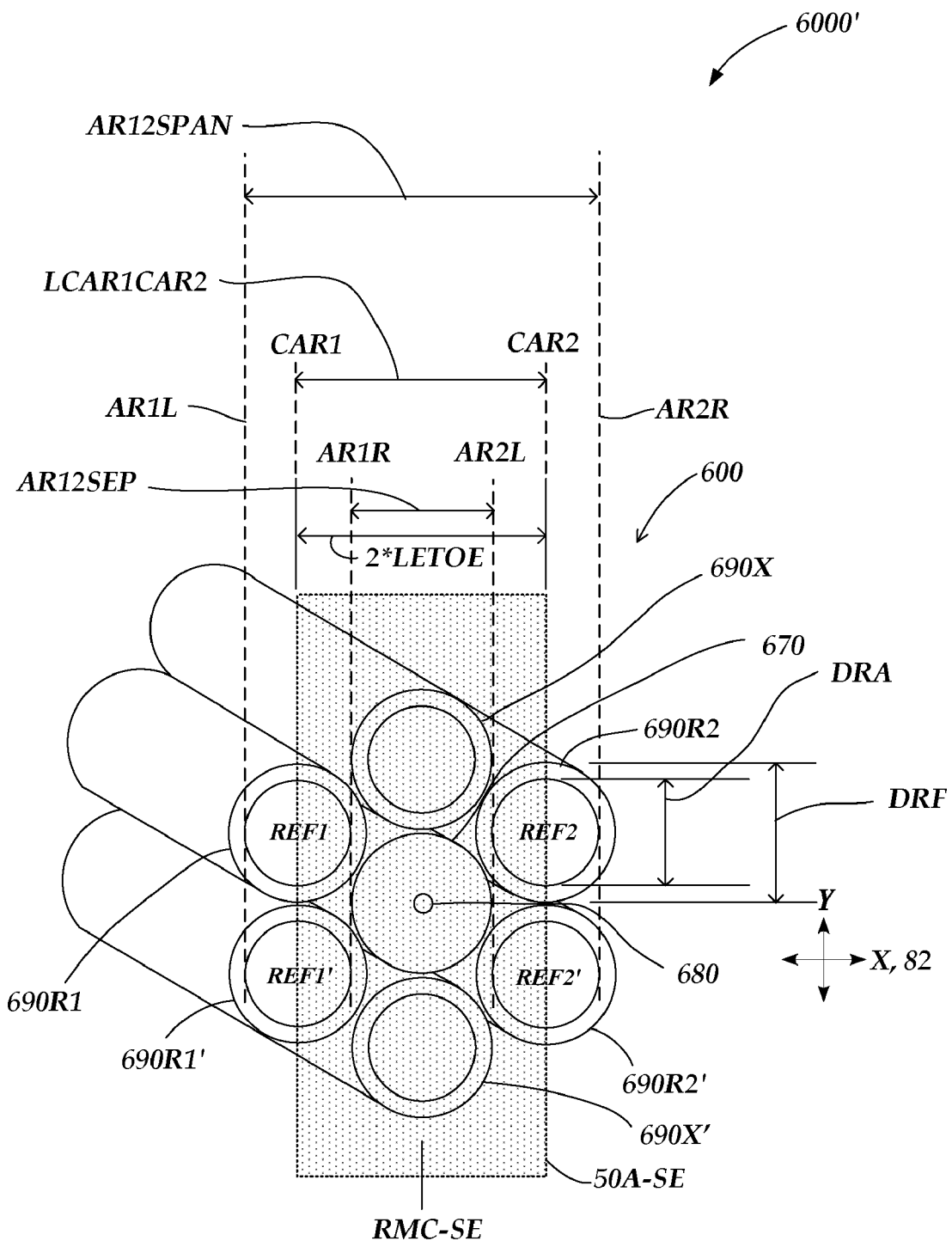

FIGS. 6A and 6B are isometric views schematically showing various aspects of a first embodiment of a reference signal generating configuration 6000 according to this invention, in relation to an illustrated dimension relationship. As illustrated in FIG. 6A, the reference signal generating configuration 6000 comprises a reference mark readhead optical fiber arrangement 600 operably positioned relative to a generic reference mark 50A, which may comprise either a mirror reference mark portion or a grating reference mark portion (e.g., on a scale member 81, not shown), depending on whichever is appropriate in a particular readhead and scale arrangement, as previously described. The reference mark 50A has a dimension LETOE along the x-axis or measuring axis direction, a dimension WY along the y-axis direction and a center line RMC along the x-axis direction. Briefly, in operation, the reference mark readhead optical fiber arrangement 600 outputs a diverging source light 650 from a central fiber, which illuminates the reference mark 50A, as illustrated by exemplary source light rays 650-1, 650-2, and 650-3. In various embodiments, the source light 650 is advantageously monochromatic and spatially coherent, and may be temporally coherent in some embodiments. If the reference mark 50A is a mirror reference mark portion surrounded by a grating track portion and/or scale track, then it will strongly reflect zero-order light back to the reference mark readhead optical fiber arrangement 600, as illustrated by the exemplary scale light rays 654-1, 654-2 and 654-3, which correspond to the source light rays 650-1, 650-2, and 650-3, respectively. In such a case, the reference mark signal effect region 50A-SE corresponding to a mirror reference mark portion will be a region of "signal increase," to the extent that it overlaps any fiber optic reference mark signal receiver channel aperture provided by the reference mark readhead optical fiber arrangement 600.

As shown in FIG. 6A, the reflected zero order scale light produces a reference mark signal effect region 50A-SE proximate to the optical signal receiver apertures provided by the ends of the optical fiber arrangement 600. The reference mark signal effect region 50A-SE has "magnified" dimensions that are twice those of the reference mark 50A, due to the divergence of the reflected scale light. In general, due to the use of diverging source light, all reference mark signal effect regions described herein will have dimensions that are twice those of their corresponding reference marks. The reference mark signal effect region 50A-SE has a center line RMC-SE along the along the x-axis direction. It will be appreciated that despite the size difference between the reference mark 50A and the reference mark signal effect region 50A-SE, their centerlines RMC and RMC-SE may be aligned along the measuring axis 82, and may displace at the same rate.

The previous description of operation has assumed that the reference mark 50A is a mirror reference mark portion (e.g., as shown in FIGS. 1 and 3). If the reference mark 50A is a grating reference mark portion surrounded by a mirror region or track portion (e.g., as shown in FIG. 2), then the exemplary source light rays 650-1, 650-2, and 650-3 and the corresponding reflected exemplary scale light rays 654-1, 654-2 and 654-3 may be interpreted as zero-order light rays that are ordinarily provided by the surrounding mirror region or track portion (e.g., the mirror portion of the scale track 88'), but that are disrupted by the zero-order reflection suppression and higher order diffraction properties of the grating portion reference mark 50A. In such a case, the corresponding reference mark signal effect region 50A-SE will be a region of "signal decrease," to the extent that it overlaps any fiber optic reference mark signal receiver channel aperture provided by the reference mark readhead optical fiber arrangement 600. It should be appreciated that a grating portion reference mark is not limited to having grating bars aligned and spaced identically to the scale grating 80. More generally, any grating portion reference mark that diffracts a significant amount of source light away from the reference mark readhead optical fiber arrangement 600 and/or significantly suppresses zero order reflection may be used (e.g., two-dimensional gratings, etc.)

FIG. 6B shows a portion 6000' of the reference signal generating configuration 6000 shown in FIG. 6A, including the reference mark readhead optical fiber arrangement 600 and the reference mark signal effect region 50A-SE. As shown in FIG. 6B, the reference mark readhead optical fiber arrangement 600 may comprise receiving fibers 690R1, 690R1', 690R2, and 690R2', having ends that provide reference mark signal receiver channel apertures that receive and provide the optical reference mark signals REF1, REF1', REF2 and REF2', as shown. The other two fibers 690X and 690X' may be optional dummy fibers, used to facilitate a close-packing assembly technique, if desired. Alternatively, in some embodiments, they may provide receiver apertures that are used to receive optical signals that may be useful for monitoring optical signal power variations, contamination effects, or other anomalies, or to provide additional light sources. The receiving fibers 690R1, 690R1', 690R2, and 690R2' may be multi-mode fibers having an outer diameter DRF and a light carrying core area having a diameter DRA that may coincide with and/or provide a reference mark signal receiver channel aperture in some embodiments. A central source fiber 670 provides a light source 680, which generally emits a diverging source light, and may be provided by the end of a single-mode core of the source fiber 670, in some embodiments.

In various embodiments, it may be advantageous to configure a readhead optical fiber arrangement such that all optical fibers located within a fiber optic readhead are located within a cylindrical volume having a diameter of at most 1.5 millimeters, or 1.0 millimeters, or less. In one exemplary embodiment of the reference mark readhead optical fiber arrangement 600, the light carrying core diameter DRA may be approximately 200 microns, which may also be the reference mark signal receiver channel aperture diameter, the outer diameters DRF may be approximately 250 microns, and the central fiber 670 may have the same outer diameter DRF and a single-mode core diameter of approximately 4-10 microns. Accordingly, in such an embodiment, the reference mark readhead optical fiber arrangement 600 may have an overall diameter on the order of 750 microns. However, it will be appreciated that in other embodiments, larger or smaller fibers and/or other fiber spacings may be used.

In FIG. 6B, dashed lines AR1L, AR1R, and CAR1 show the positions of the left and right boundaries and center location, respectively, of the reference mark signal receiver channel apertures corresponding to the signals REF1 and REF1', along the x-axis direction. Dashed lines AR2L, AR2R, and CAR2 show the positions of the left and right boundaries and center location, respectively, of the reference mark signal receiver channel apertures corresponding to the signals REF2 and REF2' along the x-axis direction. The dimension LCAR1CAR2 denotes the distance along the x-axis between the effective centers of the reference mark signal receiver channel apertures corresponding to signals REF1 and REF1' and the centers of the reference mark signal receiver channel apertures corresponding to signals REF2 and REF2'. The dimension AR12SEP denotes the separation distance between the boundaries AR1R and AR2L. More generally, as used here and in reference to FIGS. 10 and 11, the dimension AR12SEP denotes the distance along the measuring axis direction between the interior boundaries of two reference mark signal receiver channel apertures that are included in an optical fiber arrangement, that is, between their boundaries that are closest to one another along the measuring axis direction. The dimension AR12SPAN denotes the total distance spanned between the boundaries AR1L and AR2R. More generally, as used here and in reference to FIGS. 10 and 11, the dimension AR12SPAN denotes the distance spanned along the measuring axis direction between the exterior boundaries of two reference mark signal receiver channel apertures that are included in an optical fiber arrangement, that is, between their boundaries that are farthest from one another along the measuring axis direction.

For the reference signal generating configuration 6000, the most general guidelines are that the reference mark readhead optical fiber arrangement 600 and the reference mark 50A should be configured such that such that the following relationship is fulfilled $$AR12SEP < (2*LETOE) < AR12SPAN \quad \text{(Eq. 1)}$$

and such that the resulting reference mark signals are usable to define a reference position with a desired accuracy and/or repeatability within a signal crossing region proximate to the reference mark 50A, as described in greater detail below. In various embodiments, a configuration that furthermore fulfills the relationships $$(2*LETOE) > [AR12SEP + (0.25*(AR12SPAN - AR12SEP))]$$

$$(2*LETOE) < [AR12SEP + (0.75*(AR12SPAN - AR12SEP))] \quad \text{(Eqs. 2\&3)}$$

may be advantageous (e.g., by providing a more robust and/or reliable relationship between the reference mark signals). In various other embodiments, a configuration that furthermore fulfills the relationships $$(2*LETOE) > [AR12SEP + (0.4*(AR12SPAN - AR12SEP))]$$

$$(2*LETOE) < [AR12SEP + (0.6*(AR12SPAN - AR12SEP))] \quad \text{(Eqs. 4\&5)}$$

may be more advantageous. In some embodiments, it may be most advantageous if the dimension 2*LETOE is approximately equal to [AR12SEP+(0.5*(AR12SPAN−AR12SEP))], or approximately equal to the effective center to center distance LCAR1CAR2 between the reference mark signal receiver channel apertures corresponding to signals REF1 and REF2, to provide reference mark signals approximately as described below with reference to FIGS. 8 and 12.

Figure 7:
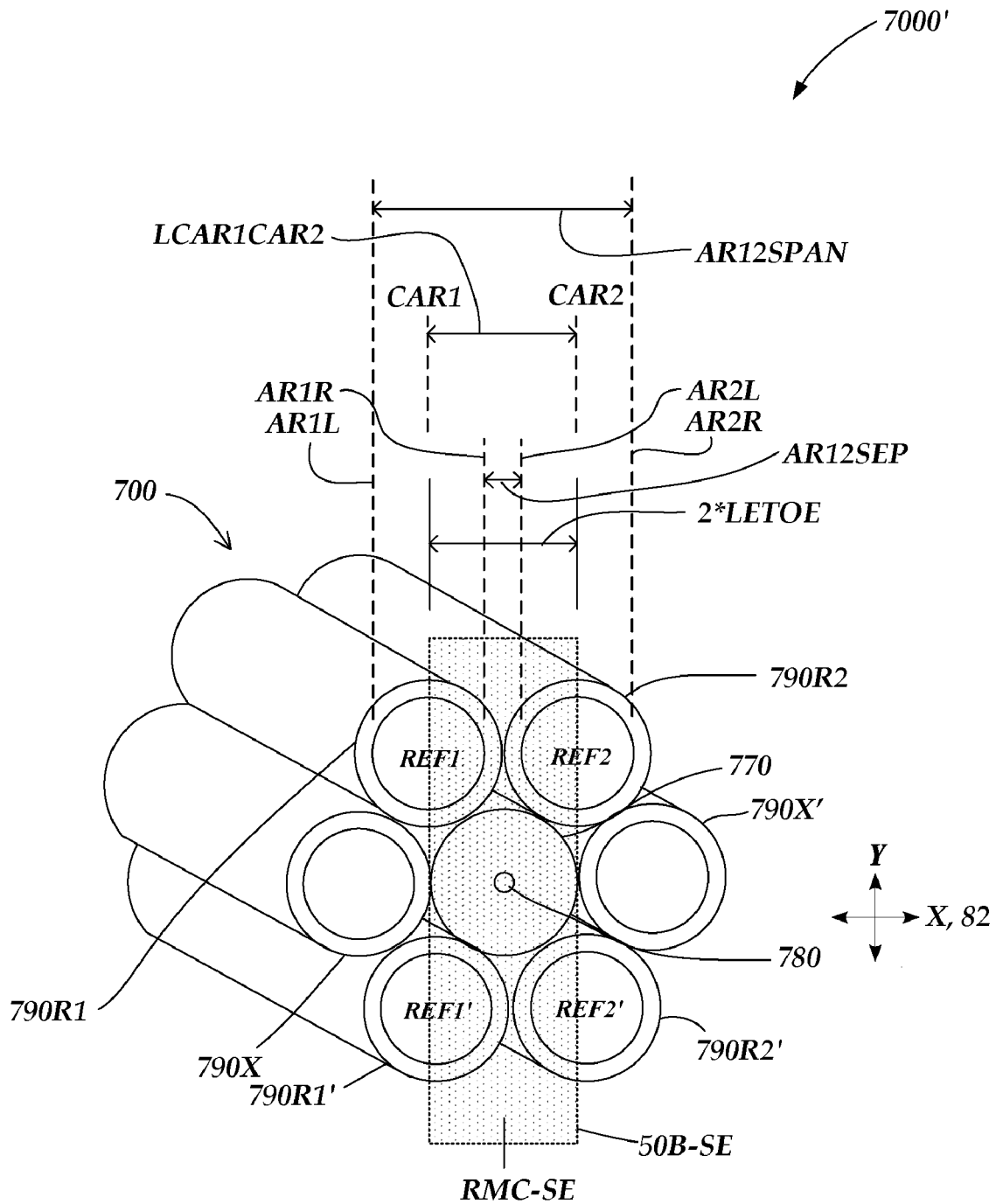
FIG. 7 is an isometric view schematically showing a portion of a second embodiment of a reference signal generating configuration according to this invention.

FIG. 7 is an isometric view of a portion 7000' of a second embodiment of a reference signal generating configuration according to this invention. The design and operation of the portion 7000' is in many respects similar to that of the portion 6000' of FIG. 6B, and similarly numbered elements in the 6XX and 7XX series of numbers (e.g., the elements 690R2 and 790R2) may be similar or identical in form and operation, except as otherwise indicated below. Generally, the design and operation of the portion 7000' may be understood based on the previous description of the portion 6000' and the reference signal generating configuration 6000. Therefore, only the significant differences between the operation of the portions 6000' and 7000' are described below.

The primary difference between the reference mark readhead optical fiber arrangements 700 and 600 is that the optical fiber arrangement 700 has a different rotational orientation in the XY plane, allowing the ends of fibers which are adjacent to one another along the x-axis direction to provide the reference mark signal receiver channel apertures that receive and provide the optical signals REF1, REF1', REF2 and REF2' (corresponding to the fibers 790R1, 790R1', 790R2, and 790R2', respectively). A reference signal generating configuration corresponding to the portion 7000' may generally be configured according to the dimensional considerations and signal considerations outlined above with reference to EQUATIONS 1-5. In some embodiments, it may be most advantageous if the dimension 2*LETOE is approximately equal to [AR12SEP+(0.5*(AR12SPAN−AR12SEP))], or approximately equal to the effective center to center distance LCAR1CAR2 between the reference mark signal receiver channel apertures corresponding to signals REF1 and REF2, to provide reference mark signals approximately as described below with reference to FIG. 8. It may be noted that since the dimension LCAR1CAR2 is less for the optical fiber arrangement 700 than for the optical fiber arrangement 600, the dimension 2*LETOE of the reference mark signal effect region 50B-SE and corresponding dimension LETOE of the corresponding reference mark (hereby designated as a reference mark 50B, not shown) are selected to be less than for the reference signal generating configuration corresponding to the portion 7000'.

As illustrated in FIGS. 6A, 6B and 7, either the reference signal generating configuration 6000, or a reference signal generating configuration corresponding to the portion 7000', is suitable for use in the readhead 200 and scale track 88 of the readhead and scale arrangement 1000 shown in FIG. 1, where a mirror portion reference mark would be located in the reference mark zone 251. Either configuration is also suitable for use in the readhead 200 and scale track 88' of the readhead the readhead and scale arrangement 2000 shown in FIG. 2, where a grating portion reference mark would be located in the reference mark zone 251'.

Figure 8:
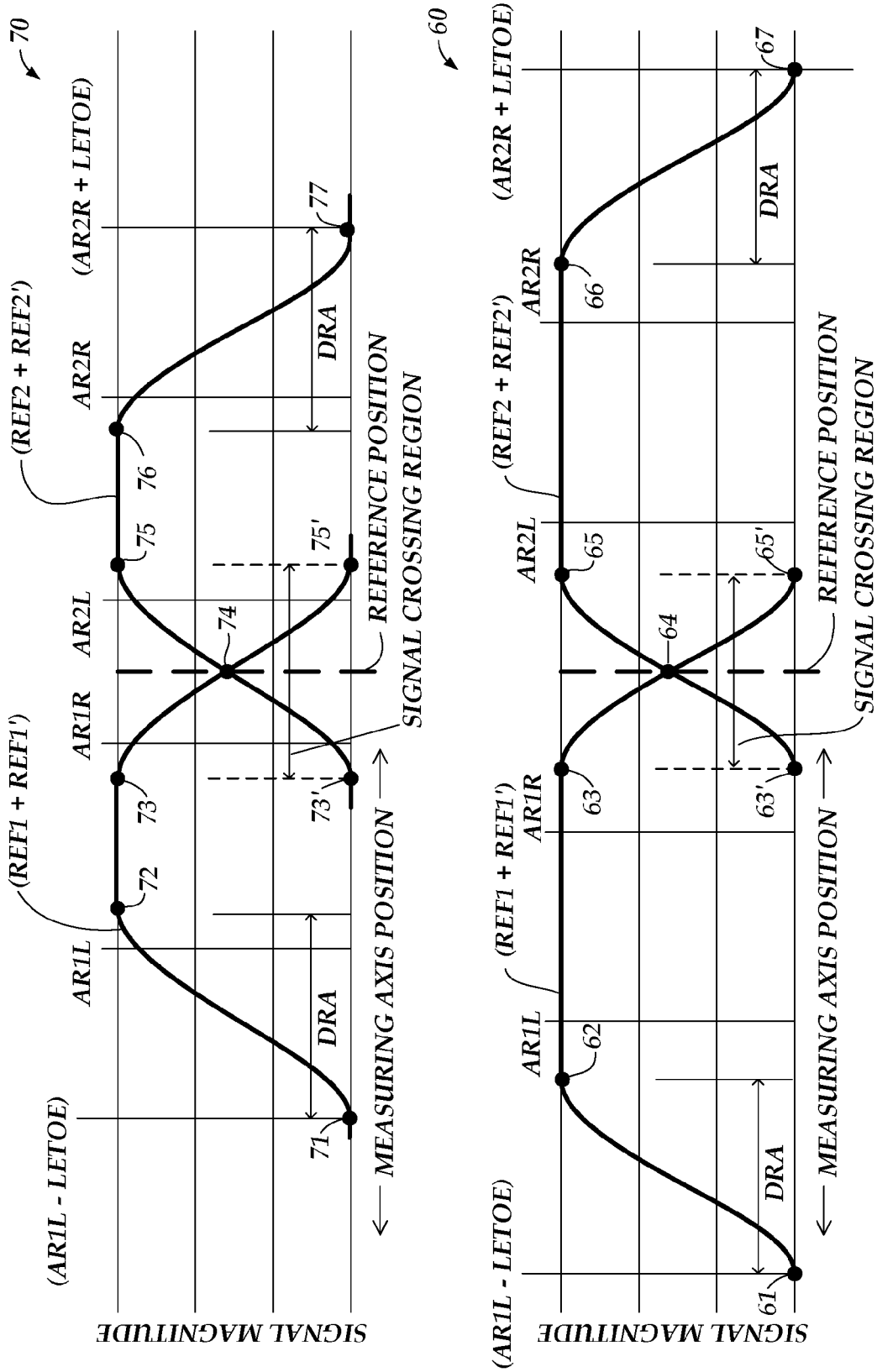
FIG. 8 is a diagram showing the reference signals generated according to the reference signal generating configurations of FIGS. 6A, 6B, and FIG. 7.

FIG. 8 is a diagram showing two schematic signal charts 60 and 70, which respectively correspond to the reference signal generating configuration 6000 of FIGS. 6A and 6B, and a reference signal generating configuration corresponding to the portion 7000', shown in FIG. 7. The signal chart 60, corresponding to the reference signal generating configuration 6000 of FIGS. 6A and 6B, shows two reference signals, a combined signal (REF1+REF1') and a combined signal (REF2+REF2), as a function of relative position along the measuring axis 82 between the reference mark signal effect region 50A-SE (or the reference mark 50A), and the reference mark readhead optical fiber arrangement 600. In particular, the point 61 corresponds to a position where the center line RMC of the reference mark 50A coincides with a position displaced by the length LETOE to the left of the position AR1L, shown in FIG. 6B. Accordingly, the reference mark signal effect region 50A-SE does not overlap any reference mark signal receiver channel apertures and no significant signal is produced at the point 61. As the reference mark 50A is displaced to the right, the reference mark signal effect region 50A-SE increasingly overlaps the REF1 and REF1' reference mark signal receiver channel apertures until a maximum is reached at a point 62, after a displacement equal to the reference mark signal receiver channel aperture diameter (e.g., the light carrying core diameter DRA). As the reference mark 50A continues to displace to the right, no further signal change is observed until the points 63 and 63', which mark the left limit of a signal crossing region where the (REF1+REF1')

signal and the (REF2+REF2') signal converge (or diverge) to (or from) a common value. In the signal crossing region, as the center line RMC of the reference mark 50A is displaced to the right of the position (AR1L+LETOE), the signal (REF1+REF1') begins to decrease as the overlap between the reference mark signal effect region 50A-SE and the REF1 and REF1' reference mark signal receiver channel apertures decreases. Because the reference mark signal receiver channel apertures have similar dimensions and the length LETOE of the reference mark 50A is selected such that the dimension 2*LETOE of the reference mark signal effect region 50A-SE is approximately equivalent to the dimension LCAR1CAR2 shown in shown in FIG. 6B, the signal (REF2+REF2') simultaneously begins to increase at the point 63', as the overlap between the reference mark signal effect region 50A-SE and the REF2 and REF2' reference mark signal receiver channel apertures increases. At a point 64, the center line RMC of the reference mark 50A is symmetrically located between the REF1/REF1' reference mark signal receiver channel apertures and the REF2/REF2' reference mark signal receiver channel apertures (at the position shown in FIG. 6B) and the signals (REF1+REF1') and (REF2+REF2') are therefore nominally equal. The behavior of the signals (REF1+REF1') and (REF2+REF2') at the remaining points 65, 65', 66 and 67 may be understood by analogy with the previous explanation. The points 65 and 65', analogous to the points 63 and 63', mark the right limit of the signal crossing region.

The signal chart 70, corresponding to a reference signal generating configuration that includes and corresponds to the portion 7000' shown in FIG. 7, is analogous to the signal chart 60, described above. That is, the point 71 is analogous to the point 61, and so on. Thus, the behavior of the signals (REF1+REF1') and (REF2+REF2') at the points 71-77 may be understood by analogy with the previous explanation, in combination with the description of FIG. 7. In particular, in the signal crossing region, as the center line RMC of the reference mark 50B is displaced to the right of the position (AR1L+LETOE), at the point 73 the signal (REF1+REF1') begins to decrease as the overlap between the reference mark signal effect region 50B-SE and the REF1 and REF1' reference mark signal receiver channel apertures decreases. Because the reference mark signal receiver channel apertures have similar dimensions and the length LETOE of the reference mark 50B is selected such that the dimension 2*LETOE of the reference mark signal effect region 50B-SE is approximately equivalent to the dimension LCAR1CAR2 shown in shown in FIG. 7, the signal (REF2+REF2') simultaneously begins to increase at the point 73', as the overlap between the reference mark signal effect region 50$b$-SE and the REF2 and REF2' reference mark signal receiver channel apertures increases. At a point 74, the center line RMC of the reference mark 50B is symmetrically located between the REF1/REF1' reference mark signal receiver channel apertures and the REF2/REF2' reference mark signal receiver channel apertures (at the position shown in FIG. 7) and the signals (REF1+REF1') and (REF2+REF2') are therefore nominally equal. It will appreciated that the features of the signals (REF1+REF1') and (REF2+REF2') of the signal chart 70 are spaced more closely along the measuring axis than those of the signal chart 60, because the reference mark length LETOE is shorter in the reference signal generating configuration corresponding to the signal chart 70, and the center-to-center spacing between the REF1/REF1' reference mark signal receiver channel apertures and the REF2/REF2' reference mark signal receiver channel apertures is also less.

In various exemplary embodiments, in order to provide a reference position along the measuring axis 82 in a robust manner, a reference position detection circuit may identify the position where the individual signals (REF1+REF1') and (REF2+REF2') cross and are equal as the reference position. It will appreciated based on the above description that in various embodiments that use either a grating portion or a mirror portion as a reference mark, selecting the edge-to-edge length LETOE according to the dimensional considerations and signal considerations outlined above in relation to EQUATIONS 1-5 generally provides a reference signal generating configuration that provides reference mark signals that are adequate to define a reference position (e.g., where two respective reference signals have equal values) within a signal crossing region proximate to a reference mark. Fulfilling the relationships of EQUATIONS 2 and 3, or 4 and 5, may provide a particularly reliable and/or robust relationship between the reference mark signals in the signal crossing region. The reference signal generating configurations corresponding to the signal charts 60 and 70 each fulfill these relationships, and thereby insure a robust signal crossing region that includes signals that nominally cross at a signal value approximately halfway between their maximum and minimum values, as shown in FIG. 8. It will be appreciated that the signal polarities shown in FIG. 8 may generally correspond to those produce by a mirror portion reference mark surrounded by a grating region. All signals would generally be inverted for a grating portion reference mark surrounded by a mirror region. In practice, all the signals will generally include common mode DC offsets, which are not shown in FIG. 8. In any case, reference signal generating configurations such as those disclosed above and further below, designed in accordance with the dimensional considerations and signal considerations outlined above with reference to EQUATIONS 1-5, can provide a plurality of respective reference mark signals that define a reference position that is repeatable to within less than one-half period of desirable spatially periodic incremental measurement signals within the signal crossing region proximate to a reference mark, such that the reference mark can reliably indicate a particular period or cycle of the incremental measuring signals and the associated particular wavelength along the scale. For example, repeatability within less than 4, or 2, microns is readily achieved, and submicron repeatability may be achieved, especially when the relationships of EQUATIONS 2 and 3, or 4 and 5, are fulfilled.

Figure 9:
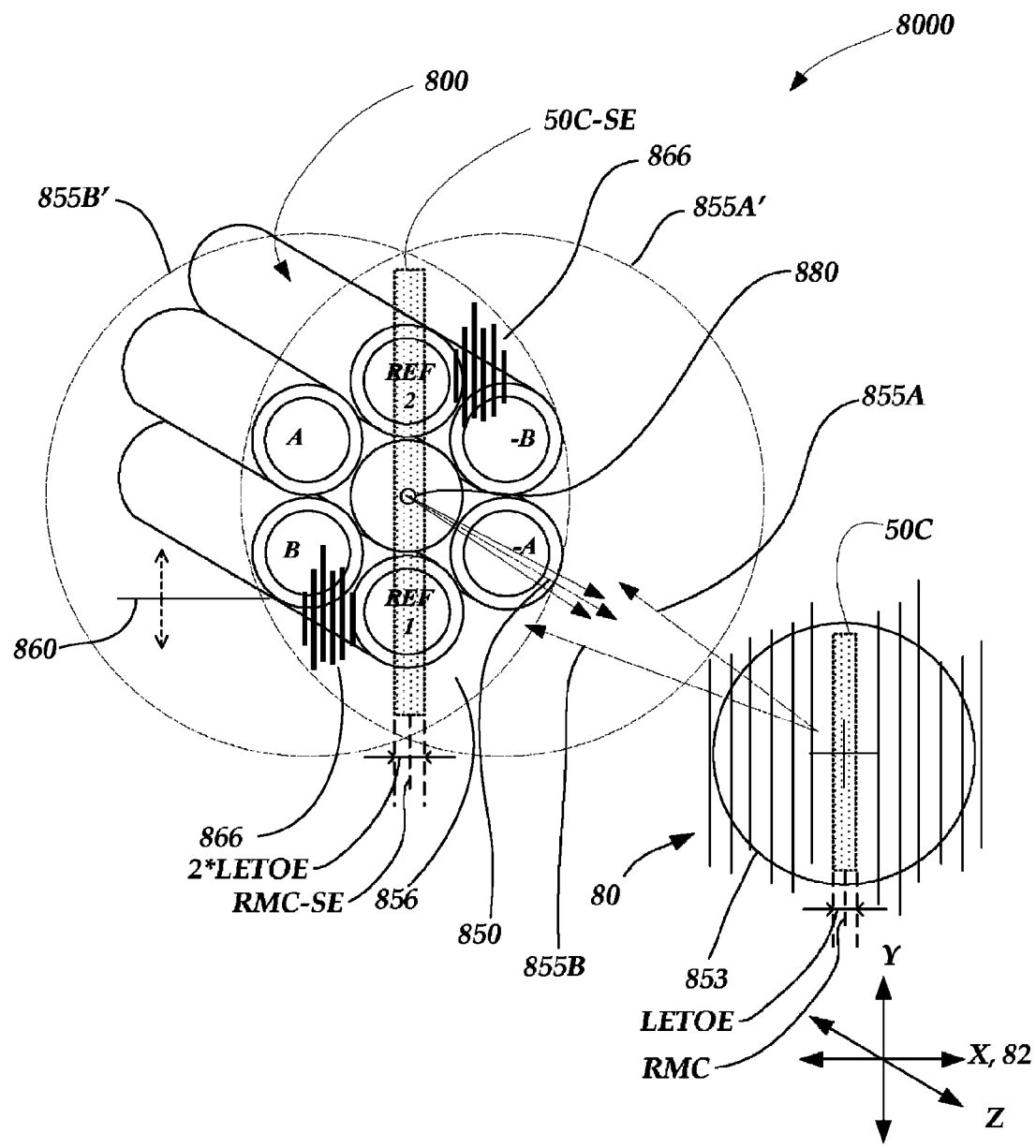
FIG. 9 is an isometric view schematically showing various aspects of the operation of a first integrated reference signal and incremental signal generating configuration according to this invention, including a third embodiment of a reference signal generating configuration according to this invention.
Figure 10:
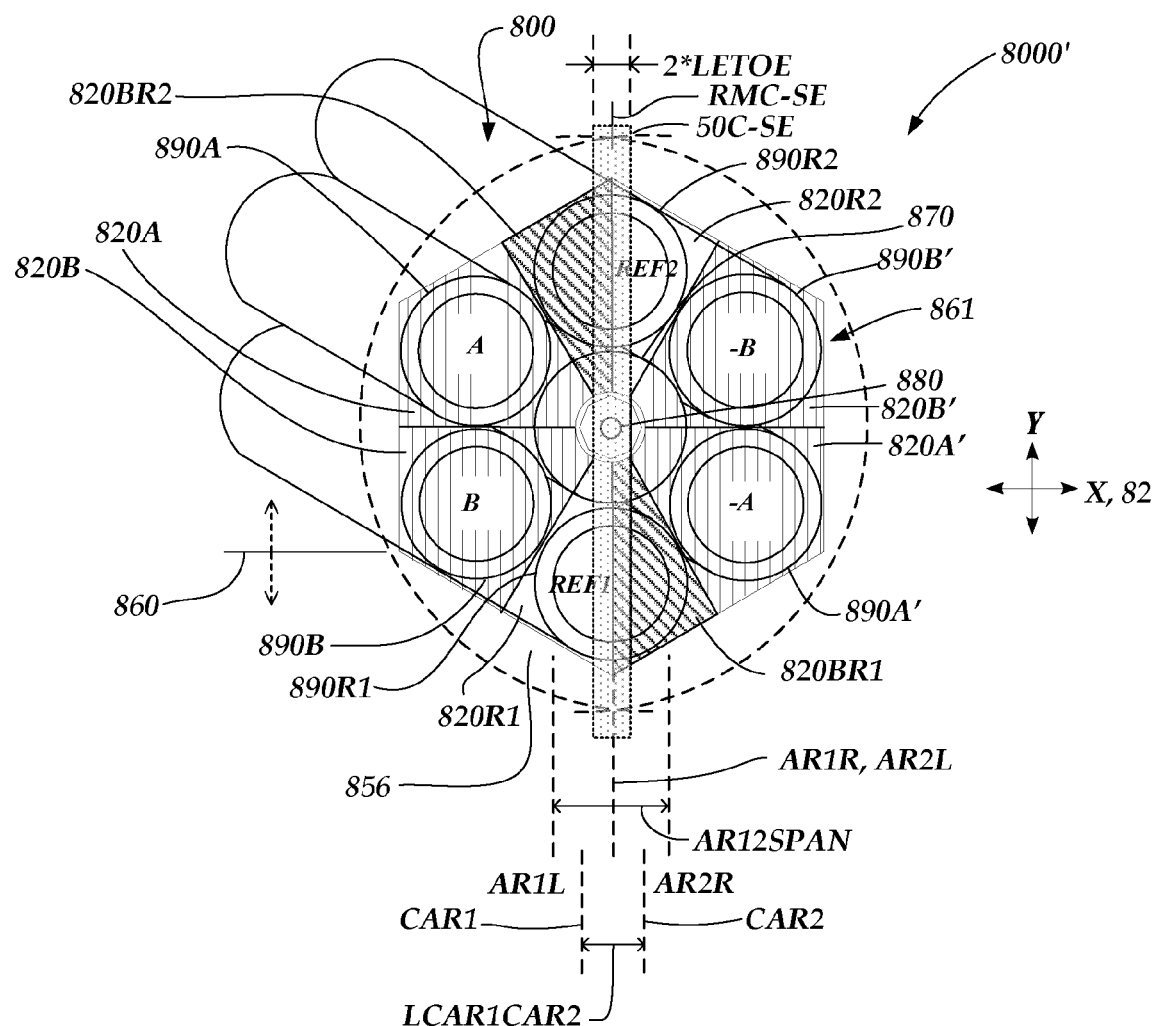
FIG. 10 is an isometric view showing a portion of the integrated reference signal and incremental signal generating configuration shown in FIG. 9, including additional details.

FIGS. 9 and 10 are isometric views schematically showing various aspects of the operation of an integrated reference signal and incremental signal generating configuration 8000 (also referred to as the integrated signal generating configuration 8000) according to this invention, including a third embodiment of a reference signal generating configuration according to this invention. The view shown in FIG. 9 does not show a phase mask element 861, which is an essential element of the integrated signal generating configuration 8000, in order to more clearly illustrate other aspects of its operation. The phase mask element 861 is described below with reference to FIG. 10.

FIG. 9 shows certain elements of the integrated signal generating configuration 8000, including an integrated readhead optical fiber arrangement 800 (less the phase mask element 861, shown in FIG. 10) operably positioned relative to a generic mirror portion reference mark 50C surrounded by the scale grating 80 (e.g., on a scale member 81, not shown). The reference mark 50C has a dimension LETOE along the x-axis direction, and a centerline RMC, as shown. Briefly, in operation, the integrated readhead optical fiber arrangement 800 outputs a diverging source light 850 from a light source 880 provided by a central fiber, which illuminates the reference mark 50C and the surrounding scale grating 80 at the illumination spot 853. In various embodiments, the source light 850 is advantageously monochromatic and spatially coherent, and may be temporally coherent in some embodiments. The scale grating 80 provides reflectively diffracted +/− first order scale light 855A and 855B, represented by its central rays in FIG. 9. The +/− first-order scale lights 855A and 855B illuminate regions 855A' and 855B', respectively, which overlap in an interference zone 856 to form interference fringes 866 proximate to a receiver plane 860 of the integrated readhead optical fiber arrangement 800. The interference fringes are spatially filtered by the phase mask element 861 (shown in FIG. 10) over the ends of the optical fibers that receive the optical quadrature signals A, A−, B and B−, according to previously described principles, and as described in greater detail below with reference to FIG. 10.

Simultaneously with the quadrature signal generating operation outlined above, when the mirror portion reference mark 50C falls within the illumination spot 853, it reflects the diverging coherent source light 850 to provide the reference mark signal effect region 50C-SE, which has dimensions that are twice those of the mirror portion reference mark 50C and a centerline RMC-SE that is aligned with the centerline RMC, according to principles previously outlined with reference to FIG. 6A. Additional details regarding the operation of the integrated reference signal and incremental signal generating configuration 8000 are described below with reference to FIG. 10.

FIG. 10 shows a portion 8000' of the integrated signal generating configuration 8000 shown in FIG. 9, including the integrated readhead optical fiber arrangement 800, the reference mark signal effect region 50C-SE, and a phase mask element 861. In order to more clearly illustrate the phase mask element 861, FIG. 10 does not show the interference fringes 866 in the interference zone 856, but it should be understood that such fringes are present during operation, as previously described. As shown in FIG. 10, the integrated readhead optical fiber arrangement 800 may comprise a central source fiber 870 that provides the light source 880, which may be provided by the end of a single-mode core of the source fiber 870 in some embodiments, and receiver fibers 890A, 890A', 890B, 890B', 890R1, and 890R2, that provide receiver channels that receive the optical signals A, −A, B, −B, REF1, and REF2, respectively, as shown. The integrated readhead optical fiber arrangement 800 also includes a phase mask element 861 comprising phase masks 820A, 820B, 820A', 820B', blocking masks 820BR1 and 820BR2, and open aperture masks 820R1 and 820R2. Dashed lines AR1L, AR1R and CAR1 show the positions of the left and right boundaries and effective center location, respectively, of the reference mark signal receiver channel aperture corresponding to the signal REF1, and dashed lines AR2L, AR2R and CAR2 show the positions of the left and right boundaries and effective center location, respectively, of the reference mark signal receiver channel aperture corresponding to the signal REF2. The dimension LCAR1CAR2 denotes the distance along the x-axis between the effective centers of the reference mark signal receiver channel apertures corresponding to signals REF1 and REF2. The dimension AR12SPAN denotes the total distance spanned between the boundaries AR1L and AR2R. As previously outlined with reference to FIG. 6B, generally herein the dimension AR12SEP denotes the distance along the measuring axis direction between the interior boundaries of two reference mark signal receiver channel apertures that are included in an optical fiber arrangement, that is, between their boundaries that are closest to one another along the measuring axis direction. For the portion 8000', the dimension AR12SEP is between the boundaries AR1R and AR2L and is zero, so it is not labeled in FIG. 10, in order to avoid confusion. It will appreciated based on the above description that in various embodiments of the integrated signal generating configuration 8000 that may use either a grating portion or a mirror portion as a reference mark, that selecting the edge-to-edge length LETOE according to the dimensional considerations and signal considerations outlined above in relation to EQUATIONS 1-5 generally provides a robust reference signal generating configuration, especially when the relationships of EQUATIONS 2 and 3, or 4 and 5, are fulfilled.

It will be appreciated that whereas the light receiving area of previously described reference mark signal receiver channel apertures has been defined solely by the light carrying core area at the end of their respective reference mark signal receiver channel optical fibers, in the integrated readhead optical fiber arrangement 800 the light receiving area of the reference mark signal receiver channel apertures 890R1 and 890R2 is defined partially by the boundary of the light carrying core area at the end of their respective receiver channel optical fibers and partially by their respective blocking/open aperture masks 820BR1/820R1 and 820BR2/820R2. Of course, in various other embodiments, analogous aperture masks could completely circumscribe and define the light receiving area of reference mark signal receiver channel apertures, if desired. The respective blocking/open aperture masks 820BR1/820R1 and 820BR2/820R2 include no structure that is spatially periodic along the measuring axis direction, so that any interference fringe light received by the reference mark signal receiver channel apertures 890R1 and 890R2 will not create a significant spatially periodic signal component that disturbs the desired reference mark signals.

Briefly, in operation, the phase masks 820A, 820B, 820A', and 820B' are located at the receiving plane 860, and spatially filter the interference fringes in the interference zone 856 to provide quadrature-type periodic incremental measurement signals A, A', B, and B', respectively. In one embodiment, the phase masks 820A, 820B, 820A', and 820B' have relative spatial phases of 0, 90, 180 and 270 degrees, respectively. It will be appreciated that the relative positions of the measurement signals A, A', B, and B', are illustrative only, and not limiting. In general, the phase masks may be configured to provide any desired arrangement for the measurement signals A, A', B, and B'. Various operation and design principles that are relevant to the phase mask element 861, as well as alternative spatial phase arrangements, are described in the incorporated references.

Blocking masks 820BR1 and 820BR2 and open aperture masks 820R1 and 820R2 are located at the receiving plane 860 to mask the ends of fibers 890R1 and 890R2 and provide reference signals REF1 and REF2. It will be appreciated that in the absence of the blocking masks 820BR1 and 820BR2 the ends of the receiver fibers 890R1 and 890R2, which are collocated along the direction of the measuring axis 82, would respond to various positions of the reference mark signal effect region 50C-SE with identical signals. In contrast, the arrangement of the masks 820BR1, 820BR2, 820R1 and 820R2 provides reference mark signal receiver channel apertures that are offset along the direction of the measuring axis 82, to provide reference signals REF1 and REF2 that exhibit a desirable signal crossing region, as described further below with reference to FIG. 12.

Regarding the signals A, A', B, and B', as previously indicated, the fringes arising from the scale grating 80 are present continuously during the operation of the integrated signal generating configuration 8000, in order to continuously generate these quadrature signals, as outlined above. In general, the fringes may be weakened when the mirror portion reference mark 50C is present in the illumination spot 853, detracting from the amount of diffracted +/− first order scale light 855A and 855B. In addition, the phase masks 820A, 820B, 820A', and 820B' will admit a portion of the zero order reflected light included in the reference mark signal effect region 50C-SE, when it overlaps their locations. As a result, the amplitudes and offsets of the quadrature signals A, A', B, B' will generally be affected by the reference mark 50C, which may detract from the resulting incremental displacement measurement accuracy. Therefore, in some embodiments, signal processing (e.g., adaptive amplitude "gain control" and/or DC offset compensation and/or phase compensation, or the like) may be applied to the quadrature signals A, A', B, and B' to at least partially negate such effects, and/or the length LETOE and/or area of the reference mark 50C may be limited to limit its disruptive effects.

Regarding the reference signals REF1 and REF2, as previously indicated, the fringes arising from the scale grating 80 are present continuously during the operation of the integrated signal generating configuration 8000. However, the open aperture masks 820R1 and 820R2 provide no spatial filtering over the ends of receiver fibers 890R1, and 890R2, and the light from a plurality of fringes simply provides a relatively constant average amount of light to the reference signals REF1 and REF2, independent of displacement. In contrast, when the reference mark signal effect region 50C-SE overlaps the locations of the open aperture masks 820R1 and 820R2, its zero order reflected light significantly increases the reference signals REF1 and REF2, as a function of the amount of overlap.

In various embodiments, it may be advantageous to configure a readhead optical fiber arrangement such that all optical fibers located within a fiber optic readhead are located within a cylindrical volume having a diameter of at most 1.5 millimeters, or 1.0 millimeters, or less. In one specific embodiment, the fibers 890 may have light carrying core areas having diameters DRA of approximately 200 microns, outer diameters DRF of approximately 250 microns and the central fiber 870 may have the same outer diameter DRF, and a single-mode core diameter, or mode-field diameter, of approximately 4-10 microns. Accordingly, in such an embodiment, the reference mark readhead optical fiber arrangement 800 may have an overall diameter on the order of 750 microns. However, it will be appreciated that in other embodiments, larger or smaller fibers and/or other fiber spacings may be used.

The scale grating 80 may have a grating pitch $P_g$ of approximately 4 microns, and the fringes 866 may have a similar pitch. The reference mark signal receiver channel apertures defined by the reference mark signal receiver fiber ends and the blocking/open aperture masks 820BR1/820R1 and 820BR2820R2 may have a dimension on the order of 100 microns along the direction of the measuring axis 82. The reference mark 50C may have a length LETOE that is advantageously of approximately 38 microns in one embodiment, which provides a desirable tradeoff between adequate reference mark signal strength and minimal disturbance to the incremental measurement signals. However, it should be appreciated that the dimensional relationships outlined above for LETOE are exemplary only, and not limiting. In various applications, additional design considerations may favor smaller or larger dimensions for LETOE.

Figure 11:
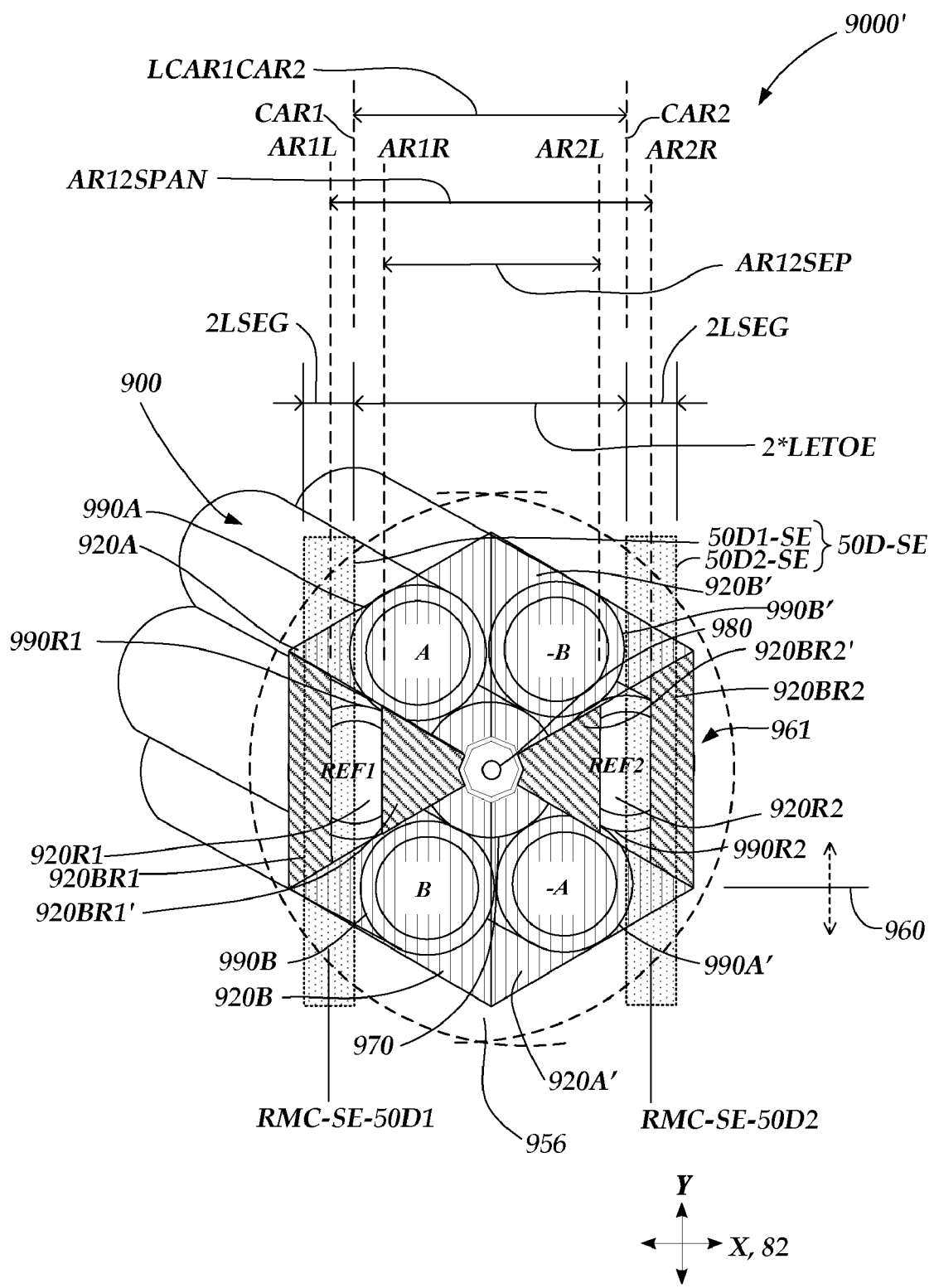
FIG. 11 is an isometric view showing a portion of a second integrated reference signal and incremental signal generating configuration according to this invention, including a fourth embodiment of a reference signal generating configuration according to this invention.

FIG. 11 is an isometric view showing a portion 9000' of a second integrated signal generating configuration according to this invention, including a fourth embodiment of a reference signal generating configuration according to this invention. The design and operation of the portion 9000' is in many respects similar to that of the portion 8000' of FIG. 10, and similarly numbered elements in the 8XX and 9XX series of numbers (e.g., the elements 820R2 and 920R2) may be similar or identical in form and operation, except as otherwise indicated below. Generally, the design and operation of the portion 9000' may be understood based on the previous description of the portion 8000' and the integrated signal generating configuration 8000. Therefore, only the significant differences between the operation of the portions 8000' and 9000' are described below.

FIG. 11 shows the portion 9000' including the integrated readhead optical fiber arrangement 900, the reference mark signal effect region 50D-SE, and a phase mask element 961. The primary difference between the portions 8000' and 9000' is that the optical fiber arrangements 800 and 900 have a different rotational orientation in the XY plane. In the optical fiber arrangement 900, receiver fibers 990R1 and 990R2, which are separated along the x-axis direction, provide the reference signals REF1 and REF2. In addition, the reference mark signal effect region 50D-SE includes two signal effect sub-regions 50D1-SE and 50D2-SE, having individual dimensions 2LSEG, and providing an interior edge-to-edge dimension 2*LETOE. It will be appreciated that a corresponding mirror portion reference mark, hereby designated 50D, (not shown) including two mirror sub-portions or reference mark portions designated 50D1 and 50D2 having individual dimensions LSEG, and providing an interior edge-to-edge dimension LETOE, provides the two separated signal effect sub-regions or reference mark portions 50D1-SE and 50D2-SE according to previously outlined principles. Although in the particular embodiment shown in FIG. 11, the dimension 2*LETOE corresponds to the distance between the interior boundaries of the two signal effect sub-regions 50D1-SE and 50D2-SE, it should be appreciated that in an alternative embodiment, the relationship between the sub-regions 50D1-SE and 50D2-SE may be such that the distance between their exterior boundaries (rather than their interior boundaries) corresponds to the same dimension 2*LETOE. In either case, it should be appreciated that by structuring a reference mark to include two reference mark sub-portions that are separated, a total area of the reference mark is advantageously limited in comparison to a single portion reference mark of similar overall length and its disruptive effects on periodic incremental measurement signals are therefore advantageously limited. In some embodiments, to provide a desirable tradeoff between adequate reference mark signal strength and minimal disturbance to the incremental measurement signals, each of the two reference mark portions may have a dimension along the measuring axis direction which is at least 0.25*(AR12SPAN−AR12SEP) and at most 0.75*(AR12SPAN−AR12SEP). In various other embodiments, each of the two reference mark portions may have a dimension along the measuring axis direction which is at least 0.4*(AR12SPAN−AR12SEP) and at most 0.6*(AR12SPAN−AR12SEP).

In any of these embodiments, selecting the edge-to-edge length LETOE according to the dimensional considerations and signal considerations outlined above in relation to EQUATIONS 1-5 generally provides a robust reference signal generating configuration, especially when the relationships of EQUATIONS 2 and 3, or 4 and 5, are fulfilled. The reference signals REF1 and REF2 provided by the integrated signal generating configuration corresponding to the portion 9000' exhibit a desirable signal relationship in a signal crossing region, as described further below with reference to FIG. 12.

As illustrated in FIGS. 9, 10 and 11, either the reference signal generating configuration 8000, or a reference signal generating configuration corresponding to the portion 9000', is suitable for use in the readhead 300 of the readhead the readhead and scale arrangements 3000 and 3000' shown in FIGS. 3 and 4.

Figure 12:
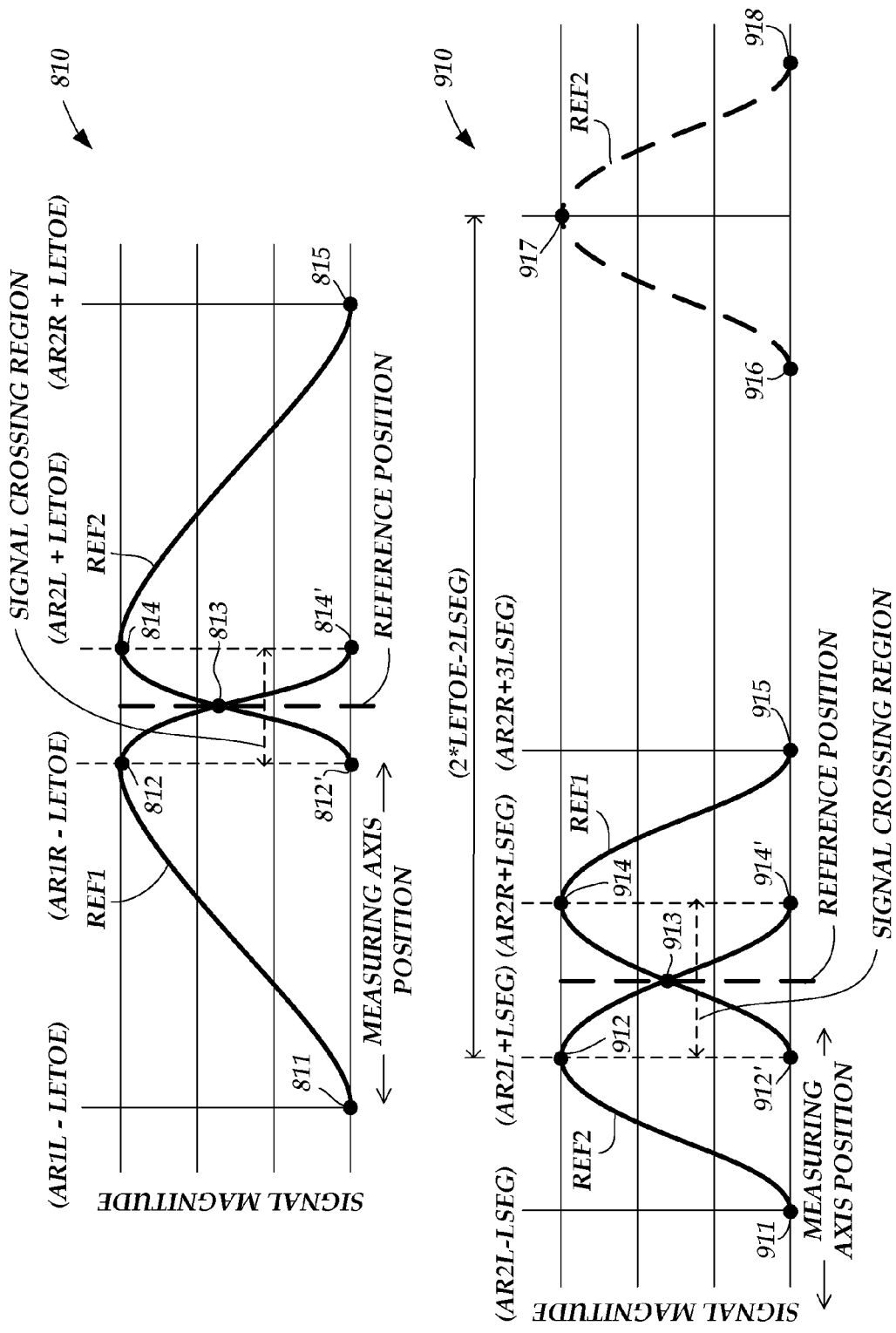
FIG. 12 is a diagram schematically showing the reference signals generated according to the integrated reference signal and incremental signal generating configurations of FIGS. 10, and 11.

FIG. 12 is a diagram showing two schematic signal charts 810 and 910, which respectively correspond to the integrated signal generating configuration 8000 shown in of FIGS. 9 and 10, and an integrated signal generating configuration corresponding to the portion 9000' shown in FIG. 11. The signal charts 810 and 910 do not have the same vertical or horizontal scaling and, in practice, all the signals will generally include common mode DC offsets, which are not shown in FIG. 12.

The signal chart 810, corresponding to the reference signal generating configuration 8000 of FIGS. 9 and 10, shows two reference signals, a signal REF1 and a signal REF2 as a function of relative position along the measuring axis 82 between the reference mark signal effect region 50C-SE (or the reference mark 50C), and the reference mark readhead optical fiber arrangement 800. In particular, the point 811 corresponds to a position where the center line RMC-SE of the reference mark 50C coincides with a position displaced by the length LETOE of the reference mark 50C to the left of the position AR1L shown in FIG. 10. Accordingly, the reference mark signal effect region 50C-SE does not overlap the REF1 reference mark signal receiver channel aperture, and no significant signal is produced at the point 811. As the reference mark 50C is displaced to the right, the reference mark signal effect region 50C-SE increasingly overlaps the REF1 reference mark signal receiver channel aperture until a maximum is reached at a point 812, at a position where the centerline RMC-SE is a distance LETOE to the left of the position AR1R shown in FIG. 10. In the signal crossing region, as the reference mark 50C continues to displace to the right from the point 812, the signal REF1 begins to decrease as the overlap between the reference mark signal effect region 50C-SE and the REF1 reference mark signal receiver channel aperture decreases. The signal REF2 simultaneously begins to increase at the point 812', as the overlap between the reference mark signal effect region 50C-SE and the REF2 reference mark signal receiver channel aperture increases. At a point 813, the center line RMC-SE of the reference mark 50C is symmetrically located along the REF1 reference mark signal receiver channel aperture and the REF2 reference mark signal receiver channel aperture (at the position shown in FIG. 10) and the signals REF1 and REF2 are therefore nominally equal. Because the reference mark signal receiver channel apertures have similar dimensions and the length LETOE of the reference mark 50C is selected such that the dimension 2*LETOE of the reference mark signal effect region 50C-SE is approximately equivalent to the dimension LCAR1CAR2 shown in shown in FIG. 10, the signals REF1 and REF2 cross at a value that is approximately midway between their maximum and minimum values in the signal crossing region, which leaves a robust margin for individual signal variations that may arise from various causes. The behavior of the signals REF1 and REF2 at the remaining points 814, 814' and 815 may be understood by analogy with the previous explanation.

The signal chart 910 corresponds to a reference signal generating configuration that includes and corresponds to the portion 9000' shown in FIG. 11. The signal chart 810 shows two reference signals, a signal REF1 and a signal REF2 as a function of relative position along the measuring axis 82 between the centerline RMC-SE-50D2 of the reference mark signal effect sub-region 50D2-SE and the optical fiber arrangement 900. It will be appreciated that the centerline RMC-SE-50D2 coincides with centerline of a corresponding reference mark sub-portion, hereby designated as sub-portion 50D2 of a two-portion reference mark 50D, which also includes a sub-portion designated 50D1. The point 911 corresponds to a position where the center line RMC-SE-50D2 coincides with a position displaced by the length LSEG to the left of the position AR2L shown in FIG. 11. Accordingly, the reference mark signal effect region 50D2-SE does not overlap with the REF2 reference mark signal receiver channel aperture, and no significant signal is produced at the point 811. As the reference mark 50D is displaced to the right, the reference mark signal effect region 50D2-SE increasingly overlaps the REF2 reference mark signal receiver channel aperture until a maximum is reached at a point 912, where the centerline RMC-SE-50D2 is a distance LSEG to the left of the position AR2R shown in FIG. 11. In the signal crossing region, as the reference mark 50D continues to displace to the right from the point 912, the signal REF2 begins to decrease as the overlap between the reference mark signal effect region 50D2-SE and the REF2 reference mark signal receiver channel aperture decreases and the signal REF1 simultaneously begins to increase at the point 912', as the overlap between the reference mark signal effect region 50D1-SE and the REF1 reference mark signal receiver channel aperture increases. At a point 913, the reference mark 50D is symmetrically located between the REF1 and REF2 reference mark signal receiver channel apertures (at the position shown in FIG. 11) and the signals REF1 and REF2 are therefore nominally equal. Because the reference mark signal receiver channel apertures have similar dimensions and the length LETOE of the reference mark 50D is selected such that the dimension 2*LETOE of the reference mark signal effect region 50D-SE is approximately equivalent to the dimension LCAR1CAR2 shown in shown in FIG. 11, the signals REF1 and REF2 cross at a value that is approximately midway between their maximum and minimum values in the signal crossing region, which leaves a robust margin for individual signal variations that may arise from various causes. The behavior of the signals REF1 and REF2 at the remaining points 914, 914' and 915 may be understood by analogy with the previous explanation.

The points 916-918 illustrate a secondary REF2 signal that is provided by the sub-region 50D1-SE overlapping the REF2 receiver, as the reference mark 50D continues to displace to the right. However, it will be appreciated that there is no complementary "crossing signal" provided by the REF1 reference mark signal receiver channel aperture corresponding to these points. An analogous REF1 signal, occurring for a displacement to the left of the illustrated signal region, is not shown. Since the reference position is established where the REF1 and REF2 signals are equal, in the signal crossing region, the secondary REF2 signal corresponding to the points 916-918 is irrelevant, as is the analogous secondary REF1 signal, except for their potential use as indicators that the reference position is approaching, or a confirmation that the reference position should have been detected and is receding, depending on the displacement direction.

Higher Resolution Reference Mark Signal
Generating Configurations

The reference mark signal generating configurations outlined above generally provide a single reference mark signal having a first level of resolution and repeatability. In various embodiments the first level of resolution and repeatability may be on the order of 0.2 microns. Hereafter, the term "reference mark primary signal" may be used to refer to reference mark signals generated as outlined above.

In some applications it may be desirable to provide reference mark signals offering an improved level of reference mark position resolution and repeatability, in comparison to the reference mark primary signals outlined above. Hereafter, the term "reference mark secondary signals" may be used to refer to such reference mark signals that offer an improved level of resolution and repeatability. The reference signal generating configurations outlined below provide such reference mark secondary signals. Briefly, the embodiments outlined below with reference to FIGS. 13-18 are generally designed in accordance with EQUATION 1 (and/or EQUATION 2, 3, 4 or 5) and use principles outlined above with reference to FIGS. 1-12 to generate reference mark primary signals, in combination with additional features outlined below, which generate reference mark secondary signals. The reference mark secondary signals indicate a reference mark position with higher resolution and repeatability than the reference mark primary signals (e.g., resolution and/or repeatability approximately ten times better, which may be on the order of 20 nanometers). However, the reference mark secondary signals are periodic. Therefore, a primary reference mark position or primary signal crossing point derived from the reference mark primary signals is used to eliminate any potential secondary reference mark position ambiguity associated with that periodicity, as described in greater detail below.

In the previous embodiments that generate only reference mark primary signals, the reference mark may comprise either a mirror-like reference mark portion located on a scale track that includes a grating (e.g., see reference scale track 88 in FIG. 1), or, alternatively, a grating type reference mark portion located on a mirror-like reference scale track (e.g., see reference scale track 88' in FIG. 2). However, in the embodiments outlined below, which also generate reference mark secondary signals, the reference mark cannot comprise a grating type reference mark portion surrounded by a mirror-like track portion, for reasons described below.

It should be appreciated that in the following description, several figures employ a reference numbering convention that relates certain elements to corresponding or analogous elements in figures described above, such that they may be understood by analogy, without additional description. According to this numbering convention, reference numbers that have similar suffixes and/or form may be analogous and may have similar design and principles of operation (e.g., 1680 is analogous to 880, 50G-SE is analogous to 50C-SE, etc.) This is similar to a numbering convention used frequently in FIGS. 1-12. However, in addition, for elements that are related to generating a reference mark primary signal in the figures described below, a "P" may also be inserted into the suffix. Thus, for example, an element numbered 1620BPR2 may be analogous to an element numbered 820BR2, based on the similar numerical suffix "20BR2" as modified with the inclusion of "P" for "primary". Similarly, an element numbered 1390PR1 may be analogous to the element number 790R1, etc. In addition, for elements that are related to generating a reference mark secondary signal in the figures described below, an "S" may be inserted into a suffix used for an analogous element. For example, except for the fact that it is used to provide a reference mark secondary signal, a receiver fiber numbered 1590SR1 may be analogous to a receiver fiber numbered 890R1, based on the similar numerical suffix "90R1" as modified with the inclusion of "S" for "secondary".

Figure 13:
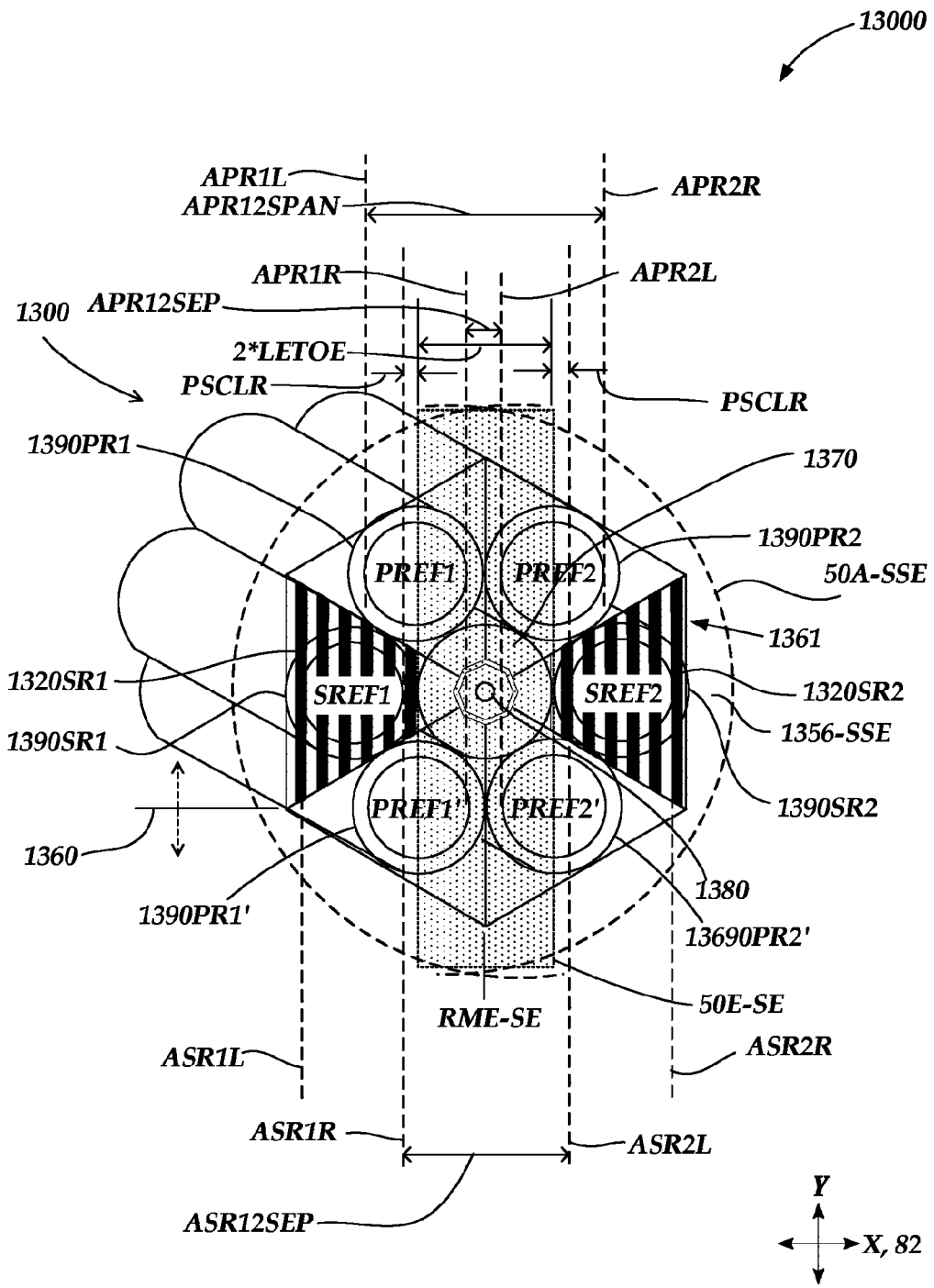
FIG. 13 is an isometric view showing a portion of a fifth embodiment of a reference signal generating configuration according to this invention.

FIG. 13 is an isometric view schematically showing various aspects of the operation of a portion of a fifth embodiment of a reference signal generating configuration 13000 according to this invention. The reference signal generating configuration 13000 generates reference mark primary signals according to principles previously outlined with reference to FIG. 7, and elements numbered with analogous numbers in FIGS. 13 and 7, may be similar or identical in form and operation, except as otherwise indicated below. FIG. 13 shows various elements of the reference signal generating configuration 13000, including a reference mark readhead optical fiber arrangement 1300, the reference mark primary signal effect region 50E-SE, and a mask element 1361. As shown in FIG. 13, the reference mark readhead optical fiber arrangement 1300 may comprise receiving fibers 1390PR1, 1390PR1', 1390PR2, 1390PR2', which receive and provide reference mark primary signals PREF1, PREF1', PREF2, PREF2', and receiving fibers 1390SR1 and 1390SR2, which receive and provide reference mark secondary signals SREF1 and SREF2 as described further below.

The reference mark primary signal effect region 50E-SE may be analogous or identical to the reference mark signal effect region 50B-SE shown in FIG. 7. Furthermore, the receiving fibers 1390PR1, 1390PR1', 1390PR2, 1390PR2', may be analogous or identical to the receiving fibers 790PR1, 790PR1', 790PR2, and 790PR2' shown in FIG. 7. The operation of these elements and the resulting signals may therefore be understood according to previously described principles.

The operation of the reference mark secondary signal receiver channels, comprising the receiving fibers 1390SR1 and 1390SR2 which carry the reference mark secondary signals SREF1 and SREF2, will now be outlined. As previously described (e.g., with reference to FIG. 9), when a mirror-like reference mark portion is surrounded by grating track portion, the grating track portion may provide reflectively diffracted +/− first order scale lights, which illuminate regions which overlap to form interference fringes in an interference zone proximate to a receiver plane of the mask element 1361. By analogy with previous figures, FIG. 13 shows such an interference zone 1356-SSE, also referred to as the reference mark secondary signal effect region 1356-SSE. It will be understood that the interference fringes are locally disrupted or dominated by zero order reflected light in the vicinity of the reference mark primary signal effect region 50E-SE, in order to provide the reference mark primary signals PREF1, PREF1', PREF2, PREF2' according to previously described principles.

The spatial filter masks 1320SR1 and 1320SR2, at the receiving plane of the mask element 1361, mask the receiver channel apertures provided by the ends of the receiving fibers 1390SR1 and 1390SR2, and spatially filter the interference fringes in the reference mark secondary signal effect region 1356-SSE to provide the spatially periodic signals SREF1 and SREF2, respectively. In various embodiments, the spatial filter masks 1320SR1 and 1320SR2 have light-blocking elements arranged at a pitch that is the same as the interference fringes, and are arranged relative to one another with a nominal spatial phase difference of 180 degrees, to provide signals SREF1 and SREF2 as described in greater detail below with reference to FIG. 14. It will be appreciated that the light blocking element pitch shown in FIG. 13, and following figures, is not necessarily to scale and may be exaggerated for purposes of illustration.

In order to provide reliable reference mark primary signals (e.g., PREF1, PREF1', PREF2, PREF2'), design considerations analogous to those previously outlined with reference to FIGS. 6-11 may be applied (e.g., by treating APR12SEP and APR12SPAN similarly to AR12SEP and AR12SPAN, etc.) In order to provide reliable reference mark secondary signals (e.g., SREF1, SREF2), additional design relationships are desirable between the dimensions and/or locations of the reference mark primary signal effect region (e.g., the region 50E-SE) and the reference mark secondary signal receiver channel apertures (e.g., as provided by the ends of the receiving fibers 1390SR1 and 1390SR2). To help explain these relationships, in addition to dimensions analogous those previously outlined with reference to FIGS. 6-11, FIG. 13 also shows dashed lines ASR1L and ASR1R, and ASR2L and ASR2R, marking the left and right boundaries, along the x-axis direction, of exemplary reference mark secondary signal receiver channel apertures provided by the receiving fibers 1390SR1 and 1390SR2.

A separation distance ASR12SEP is shown between ASR1R and ASR2L. In various embodiments according to this invention, it is beneficial to arrange a reference signal generating configuration (e.g., the reference signal generating configuration 13000) such that:

$$ASR12SEP \geq 2*LETOE \qquad (Eq.\ 6)$$

This relationship corresponds to a configuration wherein the reference mark primary signal effect region 50E-SE may be positioned between the receiver channel apertures provided by the receiving fibers 1390SR1 and 1390SR2, such that they derive desirable signals from the interference fringe light, without being significantly affected by the zero order reflected light of the primary signal effect region 50E-SE. At the same time, the reference mark primary signal effect region 50E-SE may be centered relative to the receiver channel apertures provided by the receiving fibers 1390PR1, 1390PR1', 1390PR2, and 1390PR2' in order to generate desirable reference mark primary signals (e.g., PREF1, PREF1', PREF2, PREF2') in a desirable primary signal crossing region, all approximately as shown in FIG. 13, and as described in greater detail below with reference to FIG. 14. In order to better insure such desirable signals, a clearance dimension PSCLR may be provided as shown in FIG. 13. PSCLR is the clearance from the edge of the reference mark primary signal effect region 50E-SE to the boundaries of reference mark signal secondary receiver channel apertures when the reference mark primary signal effect region 50E-SE is nominally centered between those boundaries along the measuring axis 82. Thus, in various embodiments:

$$ASR12SEP=(2*LETOE)+(2*PSCLR) \qquad (Eq.\ 7)$$

In various embodiments it is desirable for PSCLR to be greater that zero, or more desirably at least 10 microns, and in some embodiments at least 25, and in other embodiments at least 50 microns.

Figure 14:
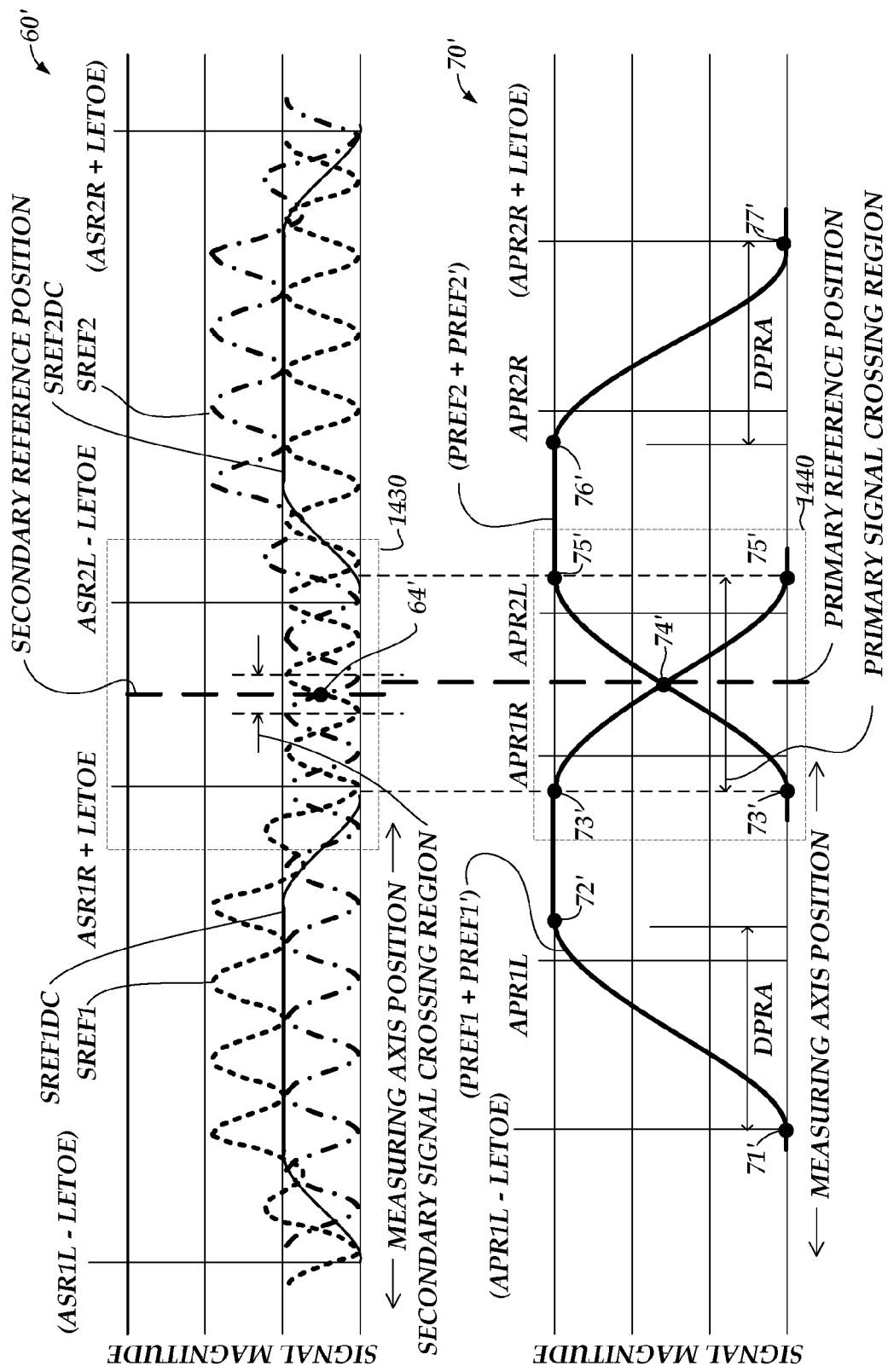
FIG. 14 is a diagram showing the reference signals generated according to the reference signal generating configuration of FIG. 13.

FIG. 14 is a diagram including a signal chart 70' schematically showing reference mark primary signals, and a signal chart 60' schematically showing reference mark secondary signals, all generated according to this invention. In various embodiments, signal amplitudes, spatial periods, etc. may vary from those shown in FIG. 14, which is illustrative only, and not limiting. For purposes of explanation, the signals are described corresponding to the reference signal generating configuration 13000 of FIG. 13. In particular, FIG. 14 shows a signal chart 70' illustrating the combined reference mark primary signals (PREF1+PREF1') and (PREF2+PREF2'). Signal chart 70' is analogous to signal chart 70 of FIG. 8, with analogous dimension names adapted to correspond to the description of FIG. 13. Signal chart 70' may therefore be understood according to previously described principles, with the difference that the primary reference position indicated by the signal crossover point 74' is regarded merely as a primary or first indicator of the reference position. As illustrated by the dashed line extending from the signal crossover point 74' to the signal chart 60', the signal crossover point 74' and/or the primary reference position has a specific fixed spatial relationship to the reference mark secondary signals SREF1 and SREF2 shown in the signal chart 60'.

As shown in the signal chart 60', and as previously explained, when a reference mark readhead optical fiber arrangement according to this invention is moved along the measuring axis 82 relative to the reference mark on the scale, the reference mark secondary signals SREF1 and SREF2 are spatially periodic with a period corresponding to the fringe pitch, and are 180 degrees out of phase with one another, due to the arrangement of the spatial filter masks 1320SR1 and 1320SR2. The signal chart 60' also shows that when the reference mark primary signal effect region 50E-SE crosses a receiver channel aperture corresponding to a reference mark secondary signal, it may generally contribute a DC signal component (e.g., the DC signal component SREF1DC or SREF2DC), that adds to the spatially periodic signal component corresponding to that receiver channel aperture. However, as shown in FIG. 14 and previously explained, when a relationship according to EQUATION 6 and/or 7 is fulfilled and the reference mark primary signals are in the primary signal crossing region, the reference mark secondary signals SREF1 and SREF2 need not include a significant DC signal component, which is advantageous for reliably determining the high resolution secondary reference position.

As schematically shown in FIG. 14, in general, a particular secondary signal crossing region of the reference mark secondary signals SREF1 and SREF2 is significantly narrower than the primary signal crossing region. It will be appreciated that the signal relationships in FIG. 14 are shown schematically, for clarity of illustration. In practice, in various embodiments, the secondary signal crossing region may be on the order of 10 times narrower than the secondary signal crossing region. Thus, in practice, the position of a particular signal crossing point 64' of the secondary signals SREF1 and SREF2, and the corresponding secondary reference position, may be determined with spatial resolution and/or accuracy that is better (e.g., about 10 times better) than the primary signal crossing point 74' and/or primary reference position.

It will be appreciated that the particular signal crossing point 64' may generally be indistinguishable from the other periodic signal crossing points that occur in its vicinity. However, the primary signal crossing point 74' has a specific fixed spatial relationship to the reference mark secondary signals SREF1 and SREF2 shown in the signal chart 60', and has a resolution and accuracy that is better +/− half a period of the secondary signals SREF1 and SREF2. Therefore, the primary signal crossing point 74' may be used to reliably indicate or identify the particular secondary signal crossing point 64'. Thus, a high resolution secondary reference position may be repeatedly and reliably determined according to this invention, based on a particular secondary signal crossing point 64'. One exemplary signal processing method for determining the high resolution secondary reference position is outlined below with reference to FIG. 19.

Figure 15:
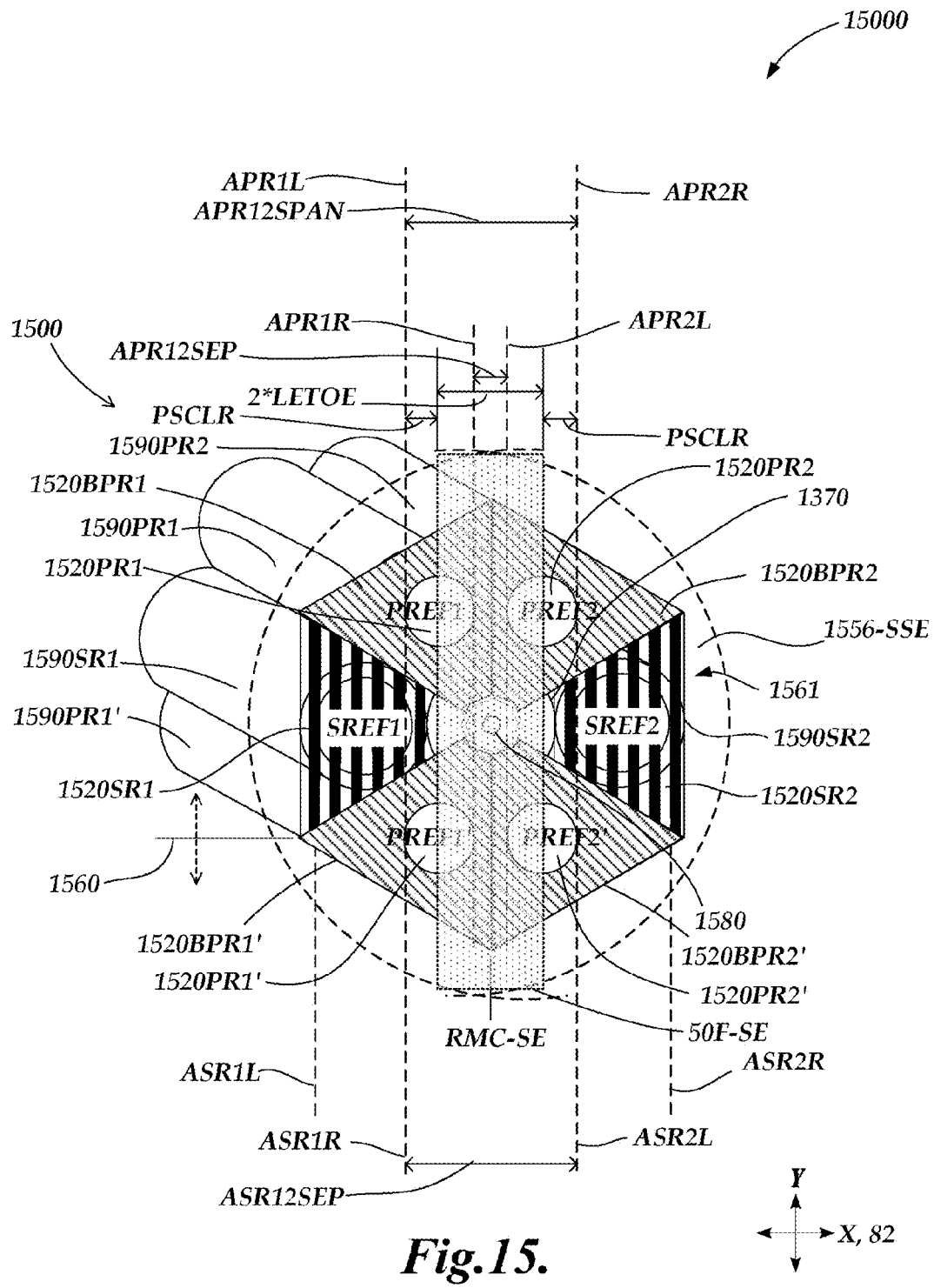
FIG. 15 is an isometric view showing a portion of a sixth embodiment of a reference signal generating configuration according to this invention.

FIG. 15 is an isometric view schematically showing various aspects of the operation of a portion of a sixth embodiment of a reference signal generating configuration 15000 according to this invention. The reference signal generating configuration 15000 generates reference mark signals according to principles previously outlined with reference to FIG. 13, and may be understood by analogy with previous description. Therefore, only significant differences are described below. Elements numbered with analogous numbers in FIGS. 15 and 13 may be similar or identical in form and operation, except as otherwise indicated below. In comparison to the reference signal generating configuration 13000 shown in FIG. 13, the primary differences in the reference signal generating configuration 15000 are that the dimension 2*LETOE of the reference mark primary signal effect region 50F-SE is significantly narrower than that of the primary signal effect region 50E-SE shown in FIG. 13, and that the receiver channel apertures associated with the reference mark primary signals PREF1, PREF1', PREF2, and PREF2' are defined by the mask element 1561. In particular, the mask element 1561 includes blocking mask portions 1520BPR1, 1520BPR1', 1520BPR2 and 1520BPR2' and open aperture mask portions 1520PR1, 1520PR1', 1520PR2 and 1520PR2', which are positioned over the receiving fibers 1590PR1, 1590PR1', 1590PR2 and 1590PR2', respectively. This arrangement provides circular (or other shapes, in various embodiments) receiver channel apertures that have dimensions and positions that are designed to complement a desired dimension 2*LETOE of the reference mark primary signal effect region 50F-SE, according to previously described principles. In comparison to the reference signal generating configuration 13000, the reference signal generating configuration 15000 may provide a larger clearance dimension PSCLR, which is advantageous for reasons outlined previously. In some embodiments, the open aperture mask portions 1520PR1, 1520PR1', 1520PR2 and 1520PR2' may be configured with a relative small dimension along the measuring axis 82, to provide a steeper reference mark primary signal change in a narrower primary signal crossover region. In some embodiments, this may enhance the resolution and/or accuracy of the primary signal crossing point 74', which may help in reliably identifying a particular secondary signal crossover region and/or signal crossover point. This may be particularly useful when the spatial period of the reference mark secondary signals is small (e.g., on the order of 4 microns). Otherwise, the design and operation of the reference signal generating configuration 15000 may be understood based the analogous design and operation previously described with reference to FIG. 13, and elsewhere herein.

Figure 16:
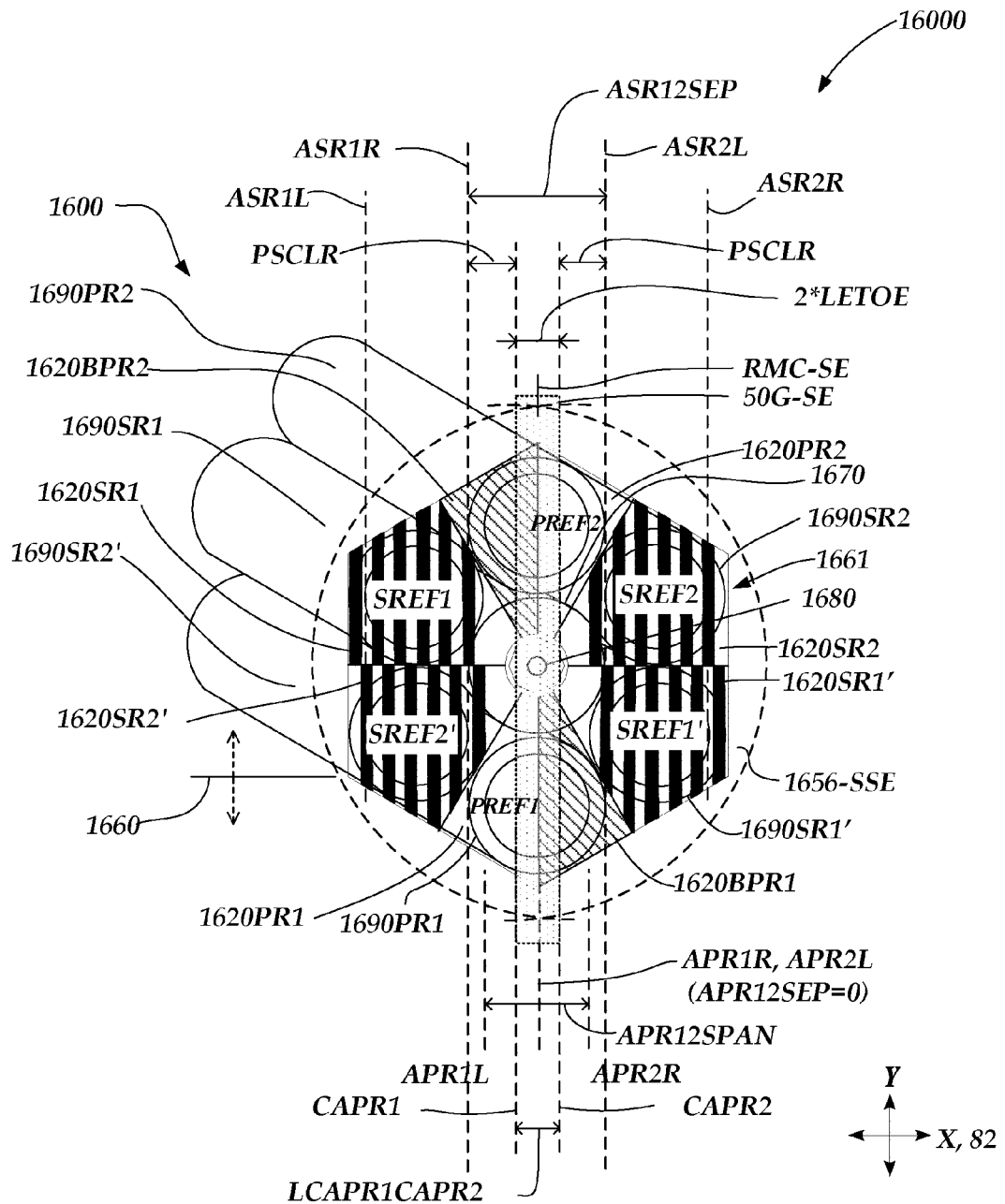
FIG. 16 is an isometric view showing a portion of a seventh embodiment of a reference signal generating configuration according to this invention.

FIG. 16 is an isometric view schematically showing various aspects of the operation of a portion of a seventh embodiment of a reference signal generating configuration 16000 according to this invention. It may be seen that in comparison to the embodiments shown in FIGS. 13 and 15, that the optical fiber arrangement 1600 shown in FIG. 16 has a different rotational orientation in the XY plane. This allows the reference mark primary signal effect region 50F-SE to be positioned between the ends of four fibers, rather than two, to provide reference mark secondary signal receiver channel apertures that receive and provide four secondary signals SREF1, SREF1', SREF2 and SREF2' (corresponding to the fibers 1690SR1, 1690SR1', 1690SR2, and 1690SR2', respectively). Otherwise, the design principles and operation of each of the receiver channels corresponding to the secondary signals SREF1, SREF1', SREF2 and SREF2' are analogous to those previously described with reference to FIG. 13. Elements numbered with analogous numbers in FIGS. 16 and 13 may have similar design principles and operation, and may be understood by analogy unless otherwise indicated below. In the embodiment shown in FIG. 16, the spatial filter masks 1620SR1 and 1620SR1' are arranged to have the same spatial phase relative to the interference fringes in the reference mark secondary signal effect region 1356-SSE. Thus, the secondary signals SREF1 and SREF1' have the same spatial phase and may be combined (e.g., added) during signal processing. The spatial filter masks 1620SR1 and 1620SR1' are also arranged to have the same spatial phase, which is approximately 180 degrees out of phase with the spatial filter masks 1620SR1 and 1620SR1'. Thus, the secondary signals SREF2 and SREF2' have the same spatial phase and may likewise be combined during signal processing. The combined secondary signals are analogous to the individual secondary signals shown in signal chart 60', and may be similarly processed.

The reference signal generating configuration 16000 generates reference mark primary signals PREF1 and PREF2 using an optical fiber and mask arrangement similar or identical to that previously described with reference to FIG. 10 for generating the analogous signals REF1 and REF2. Elements numbered with analogous numbers in FIGS. 16 and 10, may have similar or identical design principles and operation. The design and operation of the elements used to generate the reference mark primary signals PREF1 and PREF2 may therefore be understood according to previously described principles. The individual primary signals PREF1 and PREF2, are analogous to the combined primary signals in signal chart 70' in FIG. 14, and may be similarly processed.

Figure 17A:
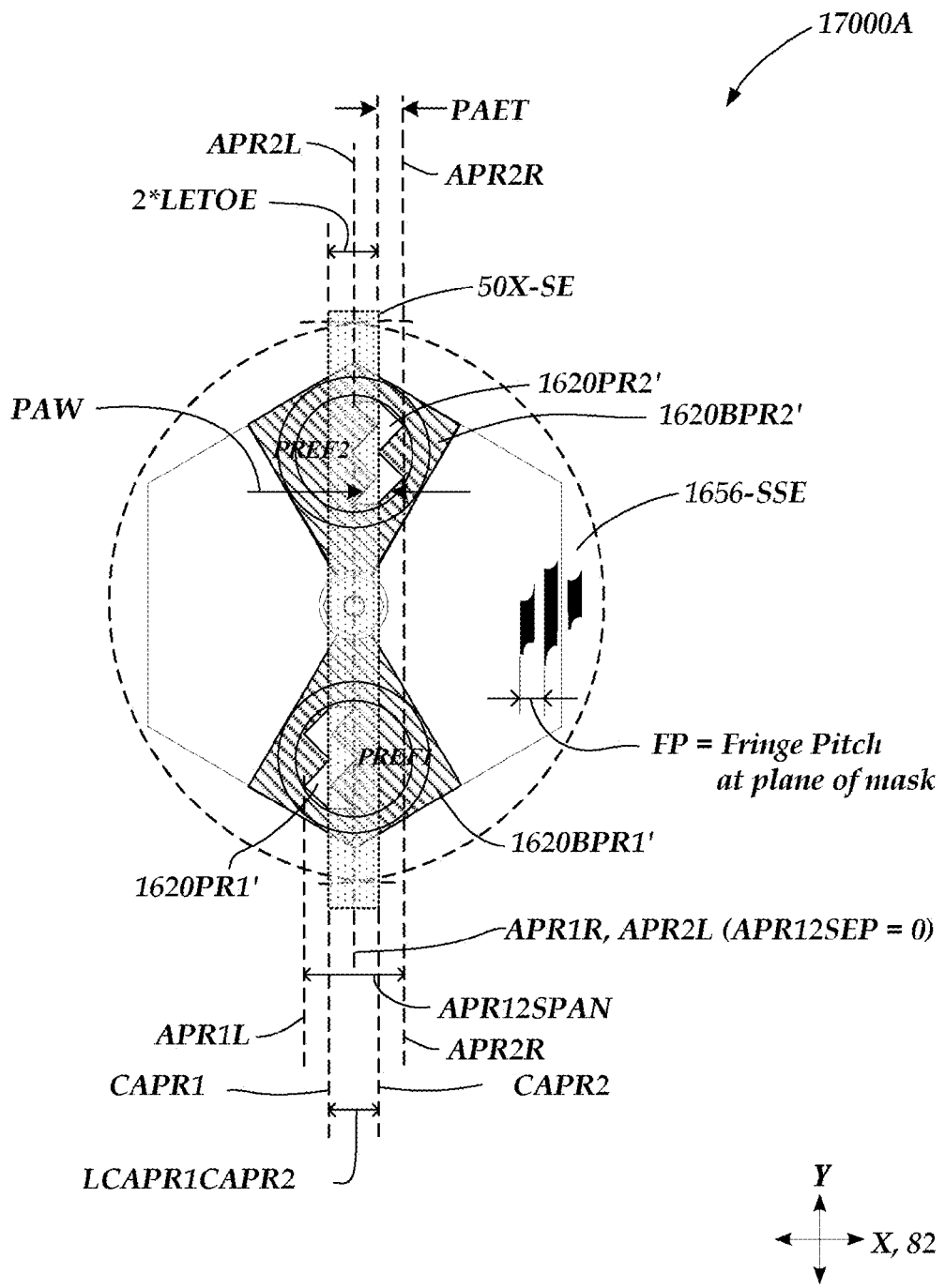
FIGS. 17A and 17B are illustrations showing alternative aperture mask configurations usable in place of portions of an aperture mask configuration shown in FIG. 16.
Figure 17B:
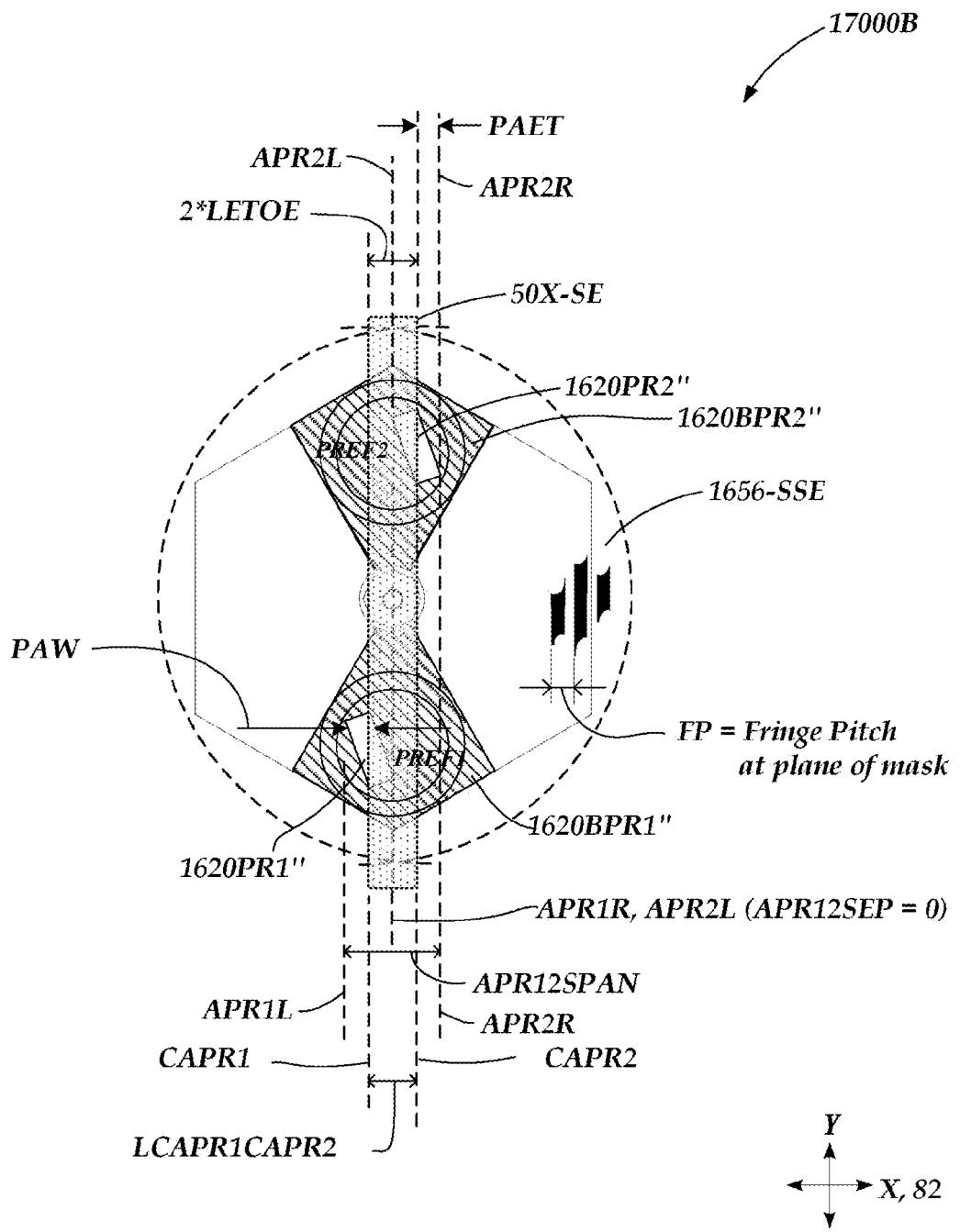

FIGS. 17A and 17B are illustrations 17000A and 17000B, respectively, showing alternative aperture mask configurations usable in place of portions of the aperture mask configuration of the mask element 1661 shown in FIG. 16. In particular, FIGS. 17A and 17B show alternative aperture mask configurations for those portions of a mask element associated with the generating the reference mark primary signals PREF1 and PREF2, which may also be referred to as primary aperture configurations. Elements numbered with analogous numbers in FIGS. 17A, 17B and FIG. 16 may have similar design principles and operation, and may be understood by analogy unless otherwise indicated below. It will be understood that mask element portions not explicitly shown in FIGS. 17A and 17B may be similar or identical to those illustrated for the mask element 1661 in FIG. 16.

In comparison to the configuration of the blocking mask 1620BPR1, open aperture mask 1620PR1, blocking mask 1620BPR2 and open aperture mask 1620PR2 shown in FIG. 16, the primary difference in FIG. 17A is that the blocking mask 1620BPR1', open aperture mask 1620PR1', blocking mask 1620BPR2' and open aperture mask 1620PR2', provide left and right aperture edges that extend transverse to the measuring axis direction, and those transverse aperture edges include zigzag portions that are angled relative to the Y axis such that each transverse aperture edge spans a primary aperture edge transition dimension PAET extending from an adjacent aperture boundary (e.g., the boundary indicated by the dashed line APR2R) along the direction of the measuring axis 82 toward the opposite edge of the aperture. A representative dimension PAET is shown only for the right edge of the open aperture mask 1620PR2', however, it will be understood that analogous dimensions PAET exist for each left and/or right aperture edge in FIG. 17A. The dimensions PAET need not be the same for each aperture edge, although they may be, in various embodiments. By angling the respective aperture edges to span their respective dimensions PAET, any interference fringes that pass across the open aperture masks 1620PR1' and/or 1620PR2' are spatially filtered such that the amplitude of their disruptive periodic optical signal contribution to the reference mark primary signals is at least partially suppressed, particularly in the vicinity of the primary signal crossing region described previously with reference to FIG. 14. It may be advantageous, in various embodiments, if each dimension PAET is at least one fringe pitch FP at the receiving plane of the mask element. In some embodiments, each dimension PAET may be at least three times FP, or more. In some embodiments, while not necessary, it may be advantageous if each dimension PAET is nominally equal to an integer number of fringe pitches FP at the receiving plane of the mask element. It will be appreciated that the fringe pitch FP shown in FIGS. 17A and 17B is not necessarily to scale and may be exaggerated for purposes of illustration.

According to a separate aspect of the configuration shown if FIG. 17A, in some embodiments, while not necessary, it may be advantageous if a primary aperture width dimension PAW is nominally equal to an integer number of fringe pitches FP at the receiving plane of the mask element, at least along a majority of the length of the apertures edges along the Y axis direction. In such a case, the disruptive optical signal contribution of any fringes that cross the open aperture masks 1620PR1' or 1620PR2' will tend to be more constant, particularly in the vicinity of the primary signal crossing region, which is less disruptive to the reference mark primary signal crossing position than a variable signal contribution from the fringes. The primary aperture width dimension PAW may vary along the Y axis direction or it may be constant. In any case, it may be defined at each location along the Y axis, as the open aperture dimension along the direction of the measuring axis 82. This design feature may be used in combination with a non-zero primary aperture edge transition dimension PAET, as shown in FIG. 17A, or it may also be beneficial in combination with straight aperture edges that are aligned along the Y axis direction.

FIG. 17B illustrates a configuration which may be understood by analogy to the previous description of FIG. 17A. In particular, the blocking mask 1620BPR1", open aperture mask 1620PR1", blocking mask 1620BPR2" and open aperture mask 1620PR2", provide left and right aperture edges that extend transverse to the measuring axis direction and those transverse aperture edges are angled relative to the Y axis such that each transverse aperture edge spans a primary aperture edge transition dimension PAET extending from an adjacent aperture boundary (e.g., the boundary indicated by the dashed line APR2R) along the direction of the measuring axis 82 toward the opposite edge of the aperture. In comparison to the configuration of FIG. 17A, the primary difference is that the apertures shown in FIG. 17B have the character of a "rotated rectangle," rather than having zigzag edges. Nevertheless, the apertures shown in FIG. 17B have analogous dimensions PAET and PAW that may fulfill the design principles previously outlined with reference for FIG. 17A. Based on the foregoing examples of FIGS. 17A and 17B, it will be appreciated that apertures edges may alternatively have segments that are curved (rather than straight and angled), or that meander in some other manner, over a primary aperture edge transition dimension PAET, and such designs may also fulfill the design principles previously outlined with reference for FIG. 17A. Therefore, it will be appreciated that the foregoing examples are illustrative only, and not limiting. It should also be appreciated that apertures designed according to the principles outlined with reference to FIGS. 17A and 17B may generally be used in various other embodiments of the invention (e.g., in place of the reference signal apertures shown in FIG. 10 or 11, etc.)

Figure 18:
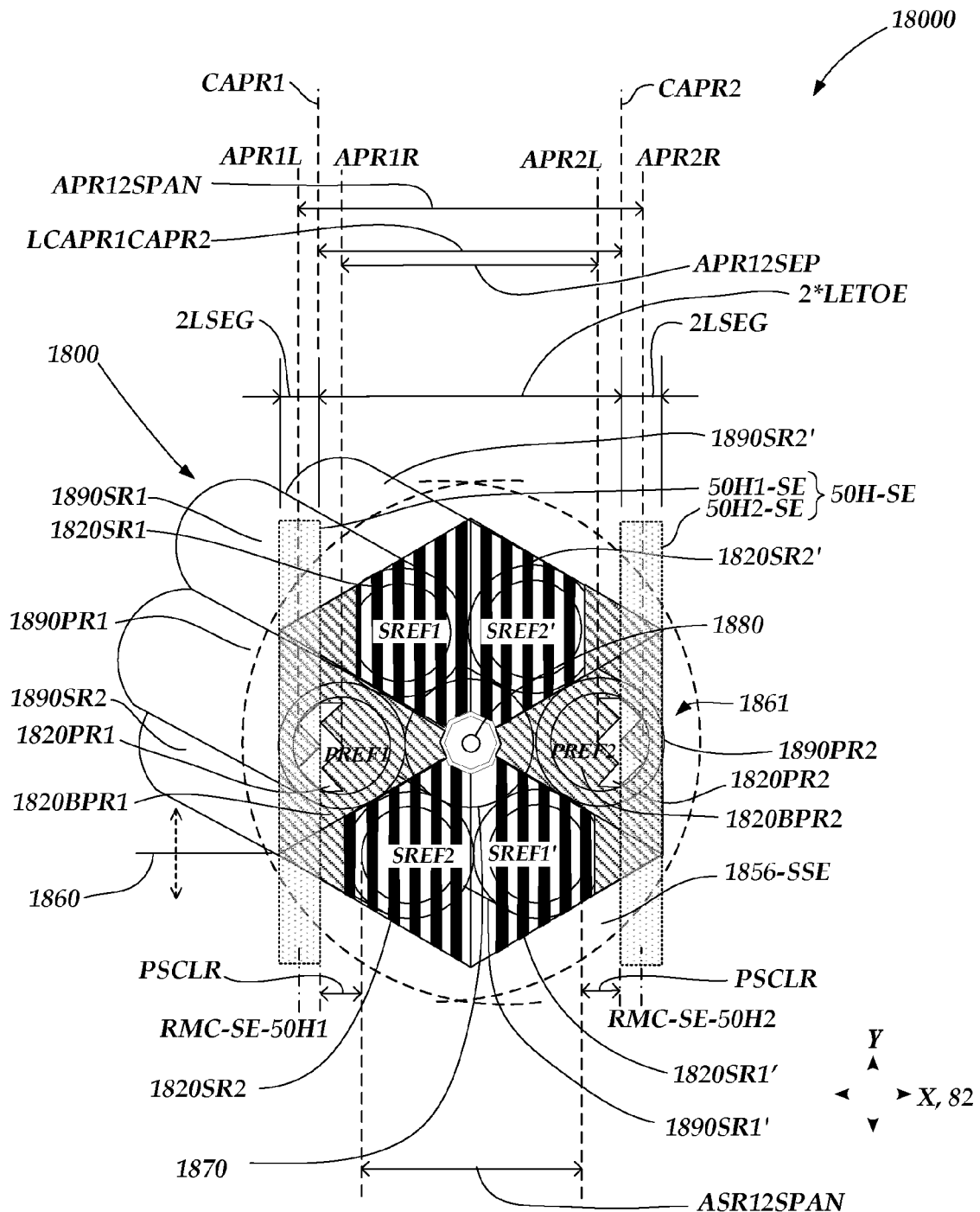
FIG. 18 is an isometric view showing a portion of an eighth embodiment of a reference signal generating configuration according to this invention.

FIG. 18 is an isometric view showing a portion of an eighth embodiment of a reference signal generating configuration 18000 according to this invention. The design and operation of the reference signal generating configuration 18000 may be thought of as a two-channel reference mark primary signal generating configuration based generally on the reference mark signal generating teachings associated with FIG. 11, in combination with a four-channel reference mark secondary signal generating configuration that is analogous to that outlined above with reference to FIG. 16. Thus, the design and operation of the reference signal generating configuration 18000 may generally be understood based on previous description. Numbered elements in the 18XX series of numbers may be similar or analogous in design principle, operation, and in some cases form, to similarly numbered elements in the 16XX series of numbers, except as otherwise indicated below. Therefore, only significant differences between the reference signal generating configurations 18000 and 16000 are described below.

The reference signal generating configuration 18000 includes the integrated readhead optical fiber arrangement 1800, the reference mark signal effect region 50H-SE, and a phase mask element 1861. It should be appreciated that the reference mark signal effect region 50H-SE includes two portions 50H1-SE and 50H2-SE. In general, the reference mark signal effect region 50H-SE is analogous to the of the two-portion reference mark signal effect region 50D-SE shown in FIG. 11 and may be similarly understood. Additional design considerations related to the reference mark signal effect region 50H-SE are outlined further below. It may be seen that in comparison to the embodiment shown in FIG. 16, that the optical fiber arrangement 1800 shown in FIG. 18 has a different rotational orientation in the XY plane, with the reference mark primary signals PREF1 and PREF2 provided by the two fibers 1890PR1 and 1890PR2 that are farthest from one another along the X axis direction and the four reference mark secondary signals SREF1, SREF1', SREF2 and SREF2' provided by the four fibers 1890SR1, 1890SR1', 1890SR2, and 1890SR2' that are closest to one another along the X axis direction. Otherwise, the design principles and operation of each of the receiver channels corresponding to the secondary signals SREF1, SREF1', SREF2 and SREF2' are analogous to those previously described with reference to FIG. 16. In particular, the spatial filter masks 1820SR1 and 1820SR1' are arranged to have the same spatial phase relative to the interference fringes in the reference mark secondary signal effect region 1856-SSE. Thus, the secondary signals SREF1 and SREF1' have the same spatial phase and may be combined (e.g., added) during signal processing. The spatial filter masks 1820SR1 and 1820SR1' are also arranged to have the same spatial phase, which is approximately 180 degrees out of phase with the spatial filter masks 1820SR1 and 1820SR1'. Thus, the secondary signals SREF2 and SREF2' have the same spatial phase and may likewise be combined during signal processing. The combined secondary signals are analogous to the individual secondary signals shown in signal chart 60', and may be similarly processed.

The reference signal generating configuration 18000 generates reference mark primary signals PREF1 and PREF2 using an aperture mask configuration including the blocking mask 1820BPR1, open aperture mask 1820PR1, blocking mask 1820BPR2 and open aperture mask 1820PR2, which are configured according to design principles previously outlined with reference to FIG. 17A. The aperture mask configuration works in cooperation with signal effect sub-regions 50H1-SE and 50H2-SE, which have individual dimensions 2LSEG, and an interior edge-to-edge dimension 2*LETOE. It will be appreciated that the signal effect sub-regions are provided by a corresponding mirror portion reference mark, hereby designated 50H, (not shown) that includes two mirror sub-portions or reference mark portions designated 50H1 and 50H2 having individual dimensions LSEG, and providing an interior edge-to-edge dimension LETOE. Although in the particular embodiment shown in FIG. 18, the dimension 2*LETOE corresponds to the distance between the interior boundaries of the two signal effect sub-regions 50H1-SE and 50H2-SE, it should be appreciated that in an alternative embodiment, the relationship between the sub-regions 50H1-SE and 50H2-SE may be such that the distance between their exterior boundaries (rather than their interior boundaries) corresponds to the same dimension 2*LETOE. In either case, it should be appreciated that by selecting the edge-to-edge length LETOE according to the dimensional considerations and signal considerations outlined above in relation to EQUATIONS 1-5, a robust reference mark primary signal generating configuration is provided, especially when the relationships of EQUATIONS 2 and 3, or 4 and 5, are fulfilled. The reference mark primary signals PREF1 and REF2 provided by the integrated signal generating configuration 18000 exhibit a desirable reference mark primary signal relationship in a signal crossing region, as previously outlined with reference to FIG. 14 and also with reference to FIG. 12.

In contrast to the reference signal generating configuration 16000, in the reference signal generating configuration 18000 the reference mark secondary signal receiver channel apertures are located between the reference mark primary signal receiver channel apertures, along the X axis direction. In such a case, in order to provide reliable reference mark secondary signals (e.g., SREF1, SREF1', SREF2, and SREF2'), additional design relationships are desirable between the dimensions and/or locations of the reference mark primary signal effect sub-regions 50H1-SE and 50H2-SE, and the reference mark secondary signal receiver channel apertures (e.g., as provided by the ends of the fibers 1890SR1, 1890SR1', 1890SR2 and 1890SR2' in conjunction with the spatial filter masks 1820SR1, 1820SR1', 1820SR2 and 1820SR2'). In particular, EQUATIONS 6 and 7 do not apply in this case. Instead, in this case it is advantageous to arrange a reference signal generating configuration (e.g., the reference signal generating configuration 18000) such that:

$$ASR12SPAN \leq 2*LETOE \quad \text{(Eq. 8)}$$

This relationship corresponds to a configuration wherein the reference mark primary signal effect sub-regions 50H1-SE and 50H2-SE may be positioned outside the reference mark secondary signal receiver channel apertures, such that they derive desirable signals from the interference fringe light, without being significantly affected by the zero order reflected light of the primary signal effect sub-regions 50H1-SE and 50H2-SE. At the same time, the edges of the reference mark primary signal effect sub-regions 50H1-SE and 50H2-SE may be centered relative to the receiver channel apertures provided by the open aperture masks 1820PR1 and 1820PR2 (e.g., as illustrated in FIG. 18), in order to generate desirable reference mark primary signals (e.g., PREF1, and PREF2') in a desirable primary signal crossing region, according to previously described principles. In order to better insure such desirable signals, clearance dimensions PSCLR may be provided as shown in FIG. 18. By analogy with previous description, PSCLR is the clearance from the edges of a reference mark primary signal effect region (or sub-region) to the boundaries of the adjacent reference mark secondary signal receiver channel apertures when the reference mark primary signal effect region (e.g., the region 50H-SE) is nominally centered relative to those boundaries along the measuring axis 82. Thus, in various embodiments analogous to that shown in FIG. 18:

$$ASR12SPAN = (2*LETOE) - (2*PSCLR) \quad \text{(Eq. 9)}$$

In various embodiments analogous to that shown in FIG. 18 it is desirable for PSCLR to be greater that zero, or more desirably at least 10 microns, and in some embodiments at least 25, and in other embodiments at least 50 microns.

Figure 19:
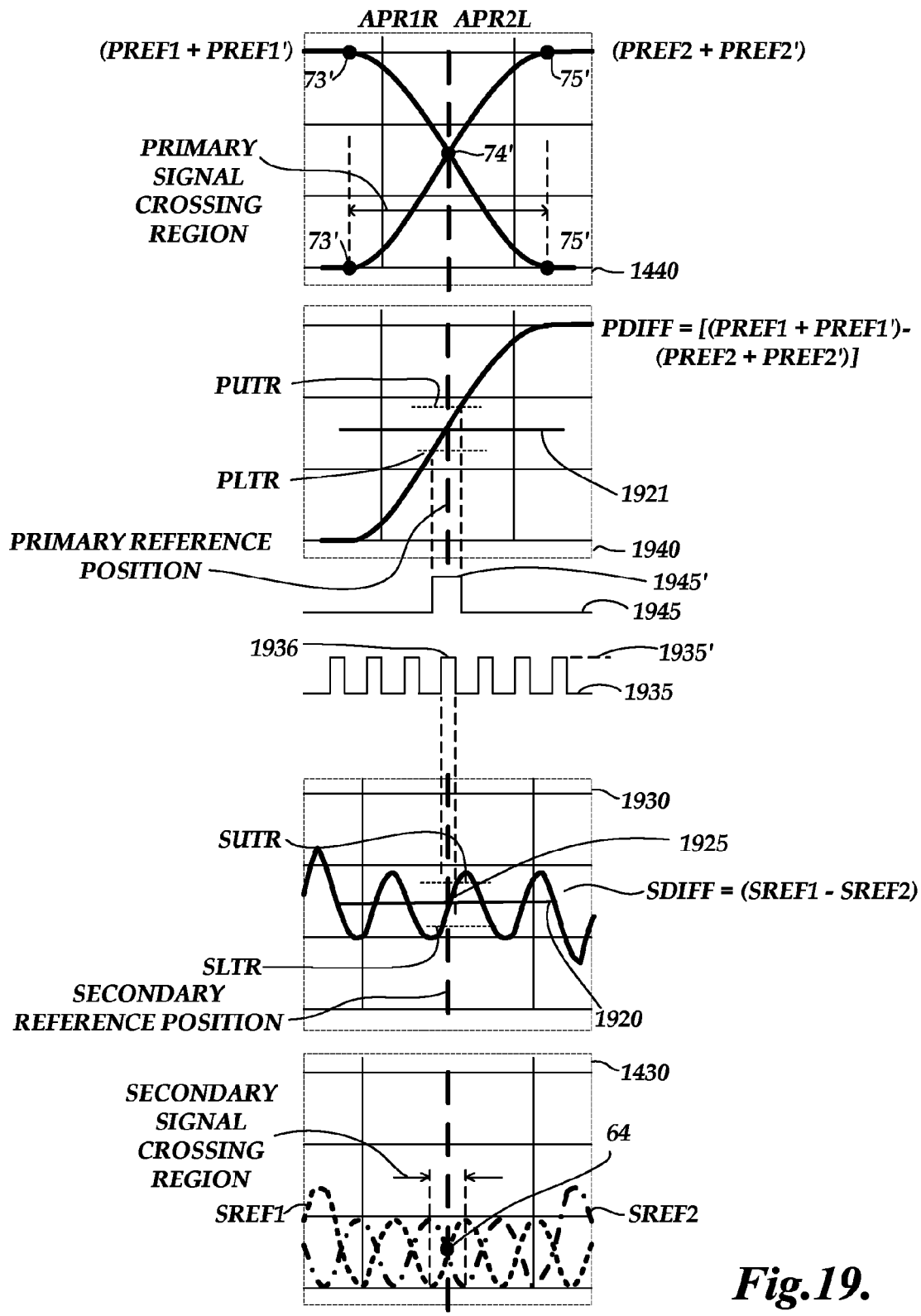
FIG. 19 is a diagram showing various signal relationships which may be associated with primary and secondary reference signals according to this invention.

FIG. 19 is a diagram schematically illustrating various signal relationships which may be associated with primary and secondary reference signals according to this invention, as well as certain aspects of one method of associated signal processing. In particular, the extreme lower and upper portions of FIG. 19 reproduce the signal chart portions 1430 and 1440 of signal charts 60' and 70', respectively, and may be understood based on previous description. FIG. 19 also shows derived signal charts 1940 and 1930, and schematically represented logic signals 1945 and 1935, described in greater detail below.

The signal chart 1940 illustrates a signal processed difference signal PDIFF, which is derived from the signals of the chart 1440 and which is equivalent to the difference between the combined reference mark primary signals (PREF1+ PREF1') and (PREF2+PREF2'). Signal chart 1940 also shows a PDIFF upper threshold PUTR and a PDIFF lower threshold PLTR which define upper and lower reference signal levels that are compared to the primary signal difference PDIFF. In one exemplary signal processing method, PUTR and PLTR are equally spaced relative to the PDIFF zero signal level 1921, which corresponds to the signal crossover point 74', which is taken as the primary reference position. In one exemplary signal processing method, when the value of PDIFF is between PLTR and PUTR, the primary reference position indicator signal 1945 will be switched to a high state 1945', which indicates that a readhead according to this invention is positioned at a primary reference position proximate to a reference mark according to this invention, within a first uncertainty range and/or first resolution level approximately corresponding to the range between PLTR and PUTR.

The signal chart 1930 illustrates a signal processed difference signal SDIFF, which is derived from the signals of the chart 1430 and which is equivalent to the difference between the reference mark secondary signals SREF1 and SREF2. Signal chart 1930 also shows an SDIFF upper threshold SUTR and an SDIFF lower threshold SLTR which define upper and lower reference signal levels that are compared to the secondary signal difference SDIFF. In one exemplary signal processing method, SUTR and SLTR are equally spaced relative to the SDIFF zero signal level 1920, which corresponds to the signal crossover point 64, which is taken as the secondary reference position. In one exemplary signal processing method, when the value of SDIFF is between SLTR and SUTR, the secondary reference position indicator signal 1935 will be switched to a high state 1935'. It should be appreciated that a readhead and reference mark scale according to this invention may be configured to provide the primary reference position indicator signal high state 1945' with sufficient resolution and repeatability that it may unambiguously correspond to a single instance 1936 of the high state 1935' of the primary reference position indicator signal. Such a single instance of the high state 1935' may indicate that a readhead according to this invention is positioned at a secondary reference position proximate to a reference mark according to this invention, within a second uncertainty range and/or second resolution level approximately corresponding to the range between PLTR and PUTR. The second uncertainty range and/or second resolution level may be significantly better than the first uncertainty range and/or first resolution level, according to previously described principles. In various embodiments, the identification of a single instance 1936 of the high state 1935' may be establish by logic operations based on the states of the signals 1945 and 1935, using known techniques. In one embodiment, the correspondence may simply be indicated by both signals being simultaneously in their high states, as illustrated in FIG. 19. However, in other embodiments, the correspondence may be established based on more complicated processing (e.g., including processing based on the relationships between rising and falling edges of the signals 1945 and 1935, etc.) Thus, the method and signals illustrated in FIG. 19 are exemplary only, and not limiting.

In one embodiment, the primary reference position may be established with a resolution and accuracy on the order of 0.2 microns, based solely on the signal 1945. The secondary reference position may then be established with a resolution and accuracy on the order of 20 nanometers, based on using the signal 1935 in conjunction with the signal 1945, as outlined above.

Figure 20A:
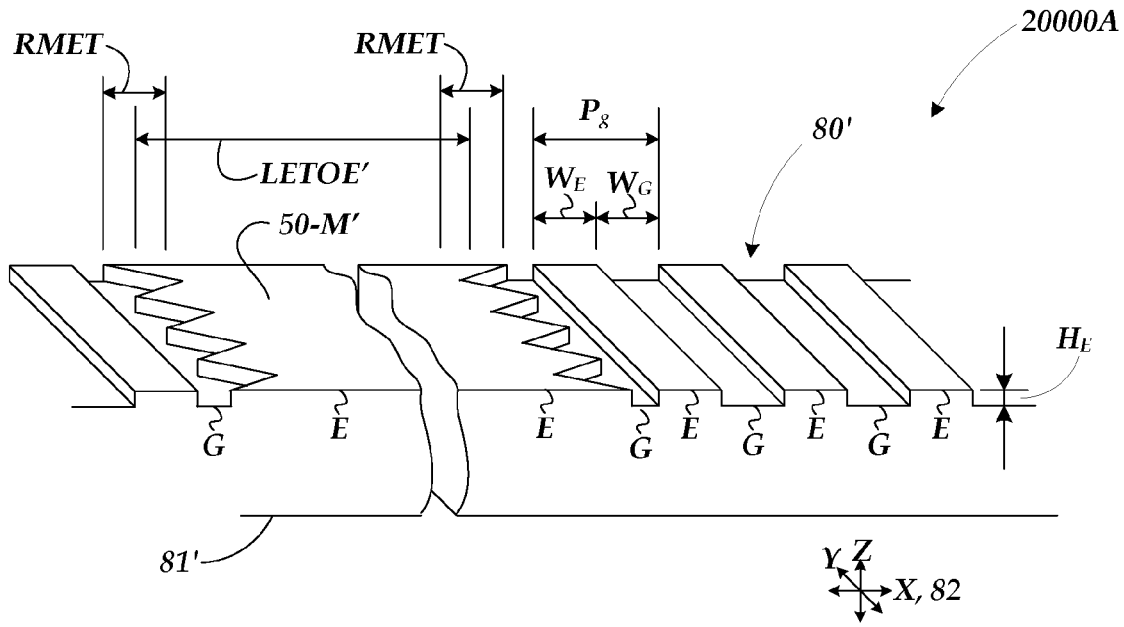
FIGS. 20A and 20B are illustrations showing alternative reference mark structures usable in place of the reference mark structure shown in FIG. 5.
Figure 20B:
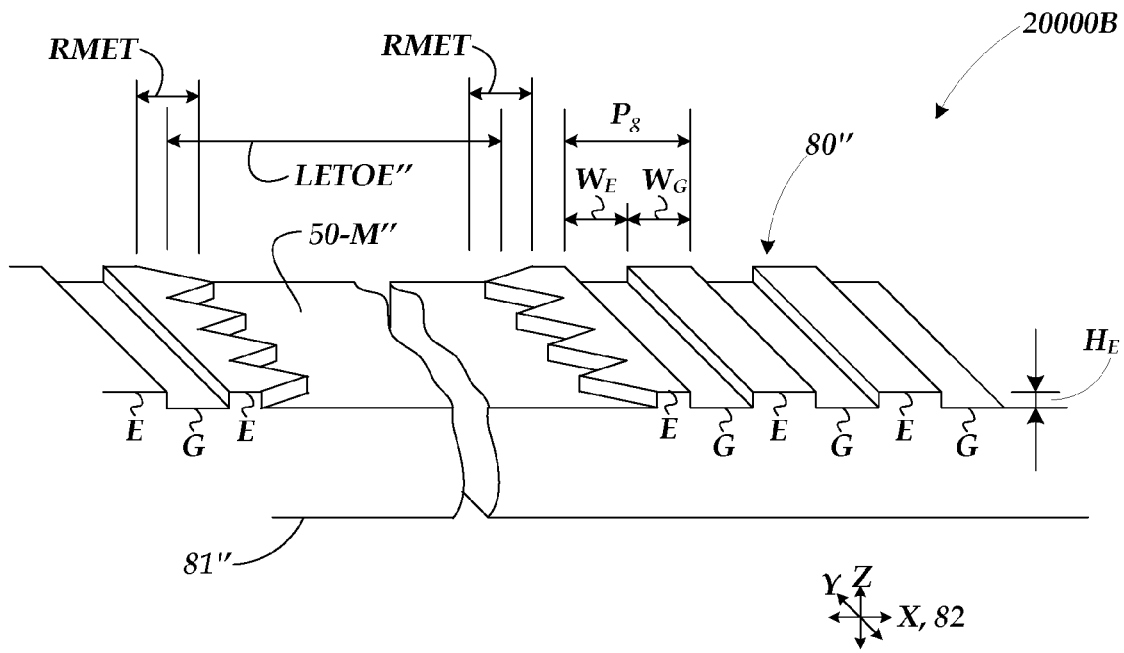

FIGS. 20A and 20B show illustrations 20000A and 20000B, respectively, which include alternative reference marks 50-M' and 50-M", respectively. The reference mark structures 50-M' and 50-M" are usable in place of the reference mark 50-M shown in FIG. 5, in various embodiments, and may be generally understood by analogy. However, in contrast to the reference mark 50-M, the transverse edges of the reference marks 50-M' and 50-M", which extend transverse to the measuring axis direction include portions that are angled relative to the Y axis direction such that the transverse edges are not straight. Stated another way, the transverse edges of each of the reference marks 50-M' and 50-M" is configured such that different respective portions of a transverse edge have respective locations along the measuring axis direction that vary as a function of position along a direction transverse to the measuring axis direction. In particular, the respective locations along the measuring axis direction, which vary as a function of position along a direction transverse to the measuring axis direction, span a corresponding reference mark edge transition zone RMET along the measuring axis direction. In various embodiments, it may be advantageous if the respective locations along the measuring axis direction vary back and forth repeatedly along the direction transverse to the measuring axis. In operation, such edge configuration may help suppresses edge diffraction effects that may otherwise arise in association with straight edges. Such edge diffraction effects may add undesirable irregularities to the reference mark primary signals and/or the reference mark secondary signals. When such edge configurations are used, it is convenient to define the dimension LETOE as the distance from the middle of a first reference mark edge transition zones RMET to the middle of an operationally corresponding second reference mark edge transition zone RMET (e.g., approximately as illustrated by the dimensions LETOE' and LETOT" in FIGS. 20A and 20B). With the dimension LETOE so defined, the reference mark may then be designed to satisfy desirable conditions outlined above with reference to EQUATIONS 1-9. In various embodiments, it may be advantageous if the transverse edges in such first and second reference mark edge transition zones are configured as a mirror image of the first reference mark portion transverse edge with respect to a symmetry axis along a direction perpendicular to the measuring axis direction, such that the resulting reference mark primary signals which cross in the signal crossing region may also tend to have a mirror image symmetry that is relatively robust.

While this invention has been described in conjunction with the exemplary embodiments outlined above, it is evident that the embodiments and design factors described above are indicative of additional alternative embodiments, modifications and variations, as will be apparent to those skilled in the art. As a first example, although the foregoing discussion describes embodiments that include mirror-type reference mark portions that include planar mirrors, more generally "significant zero order reflection" reference mark portions may be used in place of mirror reference mark portions. Such "significant zero order reflection" portions may comprise any arrangement of surfaces that provide a significant amount of zero order reflected light, and/or that disturb a significant amount of +/− first order diffracted light, such that the corresponding reference mark signal level can be distinguished from the signal level resulting from an adjacent "zero order reflection suppressing" portion (e.g., a portion of an incremental measurement scale grating or a grating track portion). For example, in various embodiments, a "significant zero order reflection" portion may comprise a phase grating with an 80-20 duty cycle (e.g., similar to the phase grating shown in FIG. 5, but with $W_E=0.8*P_g$ and $W_G=0.2*P_g$), or a 70-30 duty cycle, etc. In various other embodiments, the zero order reflection portion may comprise a 50-50 duty cycle phase grating, but with a grating bar height that does not suppress zero order reflection (e.g., similar to the phase grating shown in FIG. 5, but with $H_E=0.5*$illumination wavelength or $H_E=0.1*$illumination wavelength, etc). In other embodiments, one or more grating elements of a zero order reflection portion may be fabricated to have a different reflectance than other portions of the scale.

As a second example, it will be appreciated that in embodiments such as those shown in FIGS. 6A, 6B and 7, the individual reference signals REF1 and REF1' are redundant, and the individual reference signals REF2 and REF2' are redundant. Although certain advantages with regard to signal strength and/or alignment sensitivity may be gained from such redundancy, in general, in any embodiments disclosed herein that use redundant signals (including those that use redundant reference mark primary or secondary signals), redundant signals may be eliminated and the associated optical fiber arrangements may consist of fewer optical fibers and/or reference mark signal receiver channels, than those illustrated herein.

As a third example, although various embodiments of the invention have been illustrated using straight scale tracks, the same or similar embodiments may used with curvilinear or circular scale tracks. Thus, in various embodiments, the terms scale track and measuring axis direction, for example, may be interpreted as referring to a circular or curvilinear track or measuring axis, and the related illustrations may be interpreted as showing tangential portions of such circular or curvilinear tracks or measuring axes.

Furthermore, the various features such as angled transverse edges for apertures and/or reference marks have been described in the context of configurations that provide both reference mark primary signals and reference mark secondary signals. However, such features may also provide benefits when used in configurations that provide only reference mark primary signals (e.g., the various configurations described with reference to FIGS. 6A-12.) Accordingly, the embodiments of the invention, as set forth above, are intended to be illustrative, not limiting. Various changes may be made without departing from the spirit and scope of the invention.

The embodiments of the invention in which an exclusive property or privilege is claimed are defined as follows:

1. A fiber optic readhead and scale arrangement for measuring the relative displacement between two members along a measuring axis direction, the fiber optic readhead and scale arrangement comprising a fiber optic reference signal generating configuration usable to provide an indication of a reference position, the fiber optic reference signal generating configuration comprising:

at least a portion of a first fiber optic readhead, the at least a portion of a first fiber optic readhead comprising a light source that outputs a first diverging source light, and at least first and second fiber optic reference mark signal receiver channels that are configured to provide respective reference mark signals; and a scale member comprising at least a first scale track extending along a measuring axis direction and arranged to reflect the first diverging source light to provide scale light to the first fiber optic readhead, the first scale track comprising:

a scale grating that provides a first amount of zero order reflectance when illuminated by the first diverging source light; and at least one reference mark portion located within the scale grating, the at least one reference mark portion providing a second amount of zero order reflectance that is different than the first amount of zero order reflectance when illuminated by the first diverging source light, wherein:

the first fiber optic reference mark signal receiver channel comprises a first reference mark signal receiver channel optical fiber and a first reference mark signal receiver channel aperture, the second fiber optic reference mark signal receiver channel comprises a second reference mark signal receiver channel optical fiber and a second reference mark signal receiver channel aperture, and when the first fiber optic readhead is operably positioned relative to the first scale track the boundaries of the first and second reference mark signal receiver channel apertures that are closest to one another are separated by a dimension AR12SEP along the measuring axis direction, and the boundaries of the first and second reference mark signal receiver channel apertures that are farthest from one another span a total aperture span dimension AR12SPAN along the measuring axis direction;

the at least one reference mark portion is configured to such that two reference mark portion boundaries are separated by an edge-to-edge dimension LETOE along the measuring axis direction; and the fiber optic reference signal generating configuration is configured such that:

$$AR12SEP<(2*LETOE)<AR12SPAN,\text{ and}$$

the respective reference mark signals provide an indication of a reference position within a signal crossing region proximate to the at least one reference mark portion.

2. The fiber optic readhead and scale arrangement of claim 1, wherein the at least one reference mark portion consists of a single reference mark portion having outer boundaries that are separated by the edge-to-edge dimension LETOE.

3. The fiber optic readhead and scale arrangement of claim 1, wherein the at least one reference mark portion comprises first and second reference mark sub-portions, configured according to one of configuration A and configuration B, wherein, in configuration A the interior boundaries of the first and second reference mark sub-portions which are closest to one another are separated by the edge-to-edge dimension LETOE, and, in configuration B the exterior boundaries of the first and second reference mark sub-portions which are farthest from one another are separated by the edge-to-edge dimension LETOE.

4. The fiber optic readhead and scale arrangement of claim 3, each of first and second reference mark sub-portions has a dimension along the measuring axis direction which is at least 0.25*(AR12SPAN−AR12SEP) and at most 0.75*(AR12SPAN−AR12SEP).

5. The fiber optic readhead and scale arrangement of claim 3, each of first and second reference mark sub-portions has a dimension along the measuring axis direction which is at least 0.4*(AR12SPAN−AR12SEP) and at most 0.6*(AR12SPAN−AR12SEP).

6. The fiber optic readhead and scale arrangement of claim 1, wherein the first diverging source light is spatially coherent and monochromatic, the scale grating is one of a phase grating portion configured to suppress zero-order reflection of the first diverging source light and a zero order reflection portion, and the at least one reference mark portion is the other of a phase grating portion configured to suppress zero-order reflection of the first diverging source light and a zero order reflection portion.

7. The fiber optic readhead and scale arrangement of claim 1, further comprising:

a second scale track arranged on the scale member proximate to the first scale track, the second scale track comprising a reflective periodic scale grating extending along the measuring axis direction; and a second fiber optic readhead arranged proximate to the first fiber optic readhead, the second fiber optic readhead comprising:

a second light source configured to output a second diverging source light comprising spatially coherent monochromatic light such that the second scale track reflects the second diverging source light to provide scale light including a spatially periodic intensity pattern to the second fiber optic readhead, and a plurality of respective fiber optic incremental measurement signal receiver channels that are configured to provide respective spatially periodic incremental measurement signals, each respective fiber optic incremental measurement signal receiver channel comprising a respective incremental measurement signal receiver channel optical fiber and a respective incremental measurement signal receiver channel spatial phase mask portion arranged proximate to an end of that optical fiber, the respective incremental measurement signal receiver channel spatial phase mask portion having a respective spatial phase and having light-blocking elements arranged at a pitch that is operable for spatially filtering the spatially periodic intensity pattern included in the scale light reflected from the second scale track, wherein:

the fiber optic readhead and scale arrangement is configured such that the first and second fiber optic readheads are fixed relative to one another, and the respective reference mark signals provide the indication of the reference position within the signal crossing region proximate to the at least one reference mark portion, with a position repeatability that less than one-half period of the spatially periodic incremental measurement signals.

8. The fiber optic readhead and scale arrangement of claim 7, wherein:

the first diverging source light is spatially coherent and monochromatic;

the scale grating is one of a phase grating portion configured to suppress zero-order reflection of the first diverging source light and a zero order reflection portion;

the at least one reference mark portion is the other of a phase grating portion configured to suppress zero-order reflection of the first diverging source light and a zero order reflection portion;

the reflective periodic scale grating of the second scale track is a phase grating configured to suppress zero-order reflection of the second diverging source light; and the reflective periodic scale grating of the second scale track and the phase grating portion of the first scale track each have nominally the same recess height between their grating elements.

9. The fiber optic readhead and scale arrangement of claim 1, wherein:

the first diverging source light is spatially coherent and monochromatic;

the first scale track comprises a reflective periodic scale grating extending over a displacement measuring range along the measuring axis direction, and the reflective periodic scale grating is a phase grating configured reflect the first diverging source light suppress zero-order reflection in the scale light and to provide a spatially periodic intensity pattern in the scale light;

the scale grating that provides the first amount of zero order reflectance is provided by a portion of the reflective periodic scale grating that is proximate to the at least one reference mark portion;

the at least one reference mark portion comprises a zero order reflection portion; and the first fiber optic readhead further comprises a plurality of respective fiber optic incremental measurement signal receiver channels that are configured to provide respective spatially periodic incremental measurement signals, each respective fiber optic incremental measurement signal receiver channel comprising a respective incremental measurement signal receiver channel optical fiber and a respective incremental measurement signal receiver channel spatial phase mask portion arranged proximate to an end of that optical fiber, the respective incremental measurement signal receiver channel spatial phase mask portion having a respective spatial phase and having light-blocking elements arranged at a pitch that is operable for spatially filtering the spatially periodic intensity pattern included in the scale light reflected from the first scale track, wherein:

the fiber optic readhead and scale arrangement is configured such that the respective reference mark signals provide the indication of the reference position within the signal crossing region proximate to the at least one reference mark portion, with a position repeatability that less than +/− one-half period of the spatially periodic incremental measurement signals.

10. The fiber optic readhead and scale arrangement of claim 9, wherein:

the first light source comprises the end of a source optical fiber;

the at least first and second reference mark signal receiver channel optical fibers and each of the respective incremental measurement signal receiver channel optical fibers are located parallel to and proximate to the source optical fiber; and all optical fibers located within the first fiber optic readhead, including the source optical fiber, the at least first and second reference mark signal receiver channel optical fibers, and each of the respective incremental measurement signal receiver channel optical fibers, are located within a cylindrical volume having a diameter of at most 1.5 millimeters.

11. The fiber optic readhead and scale arrangement of claim 9, wherein the reflective periodic scale grating has a grating pitch of at least 2 microns and at most 8 microns.

12. A fiber optic readhead and scale arrangement comprising a fiber optic reference signal generating configuration usable to provide an indication of reference position between two members that move relative to one another along a measuring axis direction, the fiber optic reference signal generating configuration comprising:

at least a portion of a first fiber optic readhead, the at least a portion of a first fiber optic readhead comprising a light source that outputs a first diverging source light, and at least first and second fiber optic reference mark signal receiver channels that are configured to provide respective reference mark signals; and at least a portion of a first scale track extending along a measuring axis direction on a scale member and arranged to reflect the first diverging source light to provide scale light to the first fiber optic readhead, the at least a portion of a first scale track comprising:

a scale grating that provides a first amount of zero order reflectance when illuminated by the diverging source light; and at least one reference mark portion located within the scale grating, the at least one reference mark portion providing a second amount of zero order reflectance that is different than the first amount of zero order reflectance when illuminated by the diverging source light, wherein:

the first fiber optic reference mark signal receiver channel comprises a first reference mark signal receiver channel optical fiber and a first reference mark signal receiver channel aperture, the second fiber optic reference mark signal receiver channel comprises a second reference mark signal receiver channel optical fiber and a second reference mark signal receiver channel aperture, and the first and second reference mark signal receiver channel apertures are configured such that their boundaries that are closest to one another are separated by a dimension AR12SEP along the measuring axis direction, and their boundaries that are farthest from one another span a total aperture span dimension AR12SPAN along the measuring axis direction, when the first fiber optic readhead is operably positioned relative to the first scale track;

the at least one reference mark portion is configured to such that two reference mark portion boundaries are separated by an edge-to-edge dimension LETOE along the measuring axis direction;

the at least one reference mark portion and the first and second fiber optic reference mark signal receiver channels are configured such that AR12SEP<(2*LETOE)<AR12SPAN; and when the first fiber optic readhead is operably positioned relative to the first scale track, the at least first and second fiber optic reference mark signal receiver channels input portions of the scale light through their apertures and transmit that input light to provide their respective reference mark signals, which provide a first indication of a reference position within a signal crossing region proximate to the at least one reference mark portion.

13. The fiber optic readhead and scale arrangement of claim 12, wherein the fiber optic reference signal generating configuration is configured according to one of a single-portion reference mark configuration, and a two-subportion reference mark configuration, wherein:
in the single-portion reference mark configuration the at least one reference mark portion consists of a single reference mark portion having outer boundaries that are separated by the edge-to-edge dimension LETOE; and
in the two-subportion reference mark configuration the at least one reference mark portion comprises first and second reference mark sub-portions, configured according to one of configuration A and configuration B, wherein, in configuration A the closest boundaries of the first and second reference mark sub-portions are separated by the edge-to-edge dimension LETOE, and, in configuration B the farthest apart boundaries of the first and second reference mark sub-portions are separated by the edge-to-edge dimension LETOE.

14. The fiber optic readhead and scale arrangement of claim 13, wherein:
the first diverging source light is spatially coherent and monochromatic, the scale grating is a phase grating portion configured to suppress zero-order reflection of the first diverging source light and to provide interference fringes in at least a portion of the scale light, and the at least one reference mark portion is a zero order reflection portion; and
the fiber optic reference signal generating configuration comprises at least third and fourth fiber optic reference mark signal receiver channels that are configured to provide respective reference mark signals,
wherein:
the third fiber optic reference mark signal receiver channel comprises a third reference mark signal receiver channel optical fiber and a third reference mark signal receiver channel aperture which is masked by a first spatial filter mask having a first spatial phase;
the fourth fiber optic reference mark signal receiver channel comprises a fourth reference mark signal receiver channel optical fiber and a fourth reference mark signal receiver channel aperture which is masked by a second spatial filter mask having a second spatial phase;
in the single-portion reference mark configuration the third and fourth reference mark signal receiver channel apertures are configured such that their boundaries that are closest to one another are separated by a dimension ASR12SEP along the measuring axis direction and ASR12SEP is at least (2*LETOE);
in the two-subportion reference mark configuration the third and fourth reference mark signal receiver channel apertures are configured such that their boundaries that are farthest from one another along the measuring axis direction are separated by a dimension ASR12SPAN along the measuring axis direction and ASR12SPAN is at most (2*LETOE);
the at least first and second fiber optic reference mark signal receiver channels are reference mark primary signal receiver channels, and their respective reference mark signals are respective reference mark primary signals, which provide an indication of a primary reference position with a first level of resolution within the signal crossing region proximate to the at least one reference mark portion; and
the at least third and fourth fiber optic reference mark signal receiver channels are reference mark secondary signal receiver channels, and their respective reference mark signals are respective reference mark secondary signals, and when the first fiber optic readhead is operably positioned relative to the first scale track the at least third and fourth fiber optic reference mark signal receiver channels input portions of the scale light which include the interference fringes through their apertures and transmit that input light to provide their respective reference mark secondary signals, which provide an indication of a secondary reference position with a second level of resolution that is finer than the first level of resolution within the signal crossing region proximate to the at least one reference mark portion.

15. The fiber optic readhead and scale arrangement of claim 14, wherein:
in the single-portion reference mark configuration, the dimension ASR12SEP equals [(2*LETOE)+(2*PSCLR)];
in the two-subportion reference mark configuration, the dimension ASR12SPAN equals [(2*LETOE)−(2*PSCLR)]; and
PSCLR is at least 10 microns.

16. The fiber optic readhead and scale arrangement of claim 15, wherein PSCLR is at least 50 microns.

17. The fiber optic readhead and scale arrangement of claim 14, wherein:
second spatial phase is nominally 180 degrees out of phase with the first spatial phase;
the fiber optic readhead and scale arrangement is configured such that when the first fiber optic readhead is operably positioned relative to the first scale track and traverses the at least one reference mark portion:
the first respective reference mark primary signal decreases during the traverse and the second respective reference mark primary signal increases during the traverse, such that they provide the same signal value proximate to a primary signal crossing point within the signal crossing region,
the third respective reference mark secondary signal periodically decreases and increases during the traverse and the second respective reference mark secondary signal periodically increases and decreases during the traverse, such that they provide the same signal value proximate to each of a plurality of secondary signal crossing points within the signal crossing region; and
the secondary reference position is indicated at a position proximate to a secondary signal crossing point that is proximate to the primary signal crossing point within the signal crossing region.

18. The fiber optic readhead and scale arrangement of claim 14, wherein the zero order reflection portion is a mirror portion.

19. The fiber optic readhead and scale arrangement of claim 14, further comprising:
a second scale track arranged on the scale member proximate to the first scale track, the second scale track comprising a reflective periodic scale grating extending along the measuring axis direction; and
a second fiber optic readhead arranged proximate to the first fiber optic readhead, the second fiber optic readhead comprising:
a second light source configured to output a second diverging source light comprising spatially coherent monochromatic light such that the second scale track reflects the second diverging source light to provide scale light including a spatially periodic intensity pattern to the second fiber optic readhead, and a plurality of respective fiber optic incremental measurement signal receiver channels that are configured to provide respective spatially periodic incremental measurement signals, each respective fiber optic incremental measurement signal receiver channel comprising a respective incremental measurement signal receiver channel optical fiber and a respective incremental measurement signal receiver channel spatial phase mask portion arranged proximate to an end of that optical fiber, the respective incremental measurement signal receiver channel spatial phase mask portion having a respective spatial phase and having light-blocking elements arranged at a pitch that is operable for spatially filtering the spatially periodic intensity pattern included in the scale light reflected from the second scale track, wherein:

the fiber optic readhead and scale arrangement is configured such that the first and second fiber optic readheads are fixed relative to one another, and the indication of the secondary reference position with the second level of resolution has a position repeatability that is less than +/− on half period of the spatially periodic incremental measurement signals.

20. The fiber optic readhead and scale arrangement of claim 19, wherein:

the reflective periodic scale grating of the second scale track is a phase grating configured to suppress zero-order reflection of the second diverging source light; and the reflective periodic scale grating of the second scale track and the phase grating portion that is the scale grating in the first scale track each have nominally the same recess height between their grating elements.

21. The fiber optic readhead and scale arrangement of claim 14, wherein:

the light source comprises the end of a source optical fiber;

the at least first and second reference mark signal receiver channel optical fibers and the at least third and fourth reference mark signal receiver channel optical fibers are located parallel to and proximate to the source optical fiber; and all optical fibers located within the first fiber optic readhead, including the source optical fiber, the at least first and second reference mark signal receiver channel optical fibers, and the at least third and fourth reference mark signal receiver channel optical fibers, are located within a cylindrical volume having a diameter of at most 1.5 millimeters.

22. The fiber optic readhead and scale arrangement of claim 12, wherein:

the quantity [AR12SEP+(0.25*(AR12SPAN−AR12SEP))] is less than (2*LETOE); and the quantity [AR12SEP+(0.75*(AR12SPAN−AR12SEP))] is greater than (2*LETOE).

23. The fiber optic readhead and scale arrangement of claim 22, wherein:

the quantity [AR12SEP+(0.4*(AR12SPAN−AR12SEP))] is less than (2*LETOE); and the quantity [AR12SEP+(0.6*(AR12SPAN−AR12SEP))] is greater than (2*LETOE).

24. The fiber optic readhead and scale arrangement of claim 12, wherein the first and second reference mark signal receiver channel apertures are each defined by at least one of (a) a light carrying core area at the end of their respective reference mark signal receiver channel optical fiber, and (b) a respective aperture mask that is located proximate to the end of their respective reference mark signal receiver channel optical fiber to cover a portion of the light carrying core area, wherein the respective aperture mask includes no structure that is spatially periodic along the measuring axis direction.

25. The fiber optic readhead and scale arrangement of claim 24, wherein:

one of the scale grating and the at least one reference mark portion provides interference fringes in at least a portion of the scale light; and at least one respective aperture mask includes transverse aperture edges which extend transverse to the measuring axis, and which include at least one portion that is not perpendicular to the measuring axis direction.

26. The fiber optic readhead and scale arrangement of claim 25, wherein at least one transverse edge that includes a portion that is not perpendicular to the measuring axis direction spans an aperture edge transition dimension PAET extending from an adjacent aperture boundary along the measuring axis direction toward an opposite transverse aperture edge, and the dimension PAET spans at least one interference fringe pitch at a plane of the aperture mask, when the first fiber optic readhead is operably positioned relative to the first scale track.

27. The fiber optic readhead and scale arrangement of claim 12, wherein:

the at least one reference mark portion includes at least a first reference mark portion transverse edge which extends along a direction transverse to the measuring axis and is configured such that different respective portions of that first transverse edge have respective locations along the measuring axis direction that vary as a function of position along the direction transverse to the measuring axis, the respective locations along the measuring axis direction vary back and forth repeatedly along the direction transverse to the measuring axis, the respective locations spanning a corresponding reference mark edge transition zone along the measuring axis direction, and for purposes of defining LETOE, the boundary of that first transverse edge is defined to be located at the middle of the corresponding reference mark edge transition zone along the measuring axis direction.

28. The fiber optic readhead and scale arrangement of claim 27, wherein:

the at least one reference mark portion includes a second reference mark portion transverse edge which extends along a direction transverse to the measuring axis and is configured such that different respective portions of that second transverse edge have respective locations along the measuring axis direction that vary as a function of position along the direction transverse to the measuring axis; and the second reference mark portion transverse edge is configured as a mirror image of the first reference mark portion transverse edge with respect to a symmetry axis along a direction perpendicular to the measuring axis direction.

29. The fiber optic readhead and scale arrangement of claim 12, wherein:

the light source comprises the end of a source optical fiber;

the at least first and second reference mark signal receiver channel optical fibers are located parallel to and proximate to the source optical fiber; and all optical fibers located within the first fiber optic readhead, including the source optical fiber and the at least first and second reference mark signal receiver channel optical fibers, are located within a cylindrical volume having a diameter of at most 1.5 millimeters.

* * * * *

UNITED STATES PATENT AND TRADEMARK OFFICE
CERTIFICATE OF CORRECTION

| PATENT NO. | : 7,965,393 B2 |
| --- | --- |
| APPLICATION NO. | : 12/275170 |
| DATED | : June 21, 2011 |
| INVENTOR(S) | : A. Zwilling et al. |

Page 1 of 1

It is certified that error appears in the above-identified patent and that said Letters Patent is hereby corrected as shown below:

| COLUMN | LINE | ERROR |
| --- | --- | --- |
| 36 (Claim 7, | 59 line 39) | "that less than" should read --that is less than-- |
| 37 (Claim 9, | 53 line 40) | "less than" should read --is less than-- |
| 41 (Claim 19, | 25 line 38) | "on half" should read --one-half-- |

Signed and Sealed this
Twenty-second Day of May, 2012

David J. Kappos
*Director of the United States Patent and Trademark Office*